United States Patent
Nakai et al.

(10) Patent No.: US 11,762,276 B2
(45) Date of Patent: *Sep. 19, 2023

(54) PHOTORESPONSIVE COMPOUND

(71) Applicant: Konica Minolta, Inc., Tokyo (JP)

(72) Inventors: Yukiko Nakai, Toyohashi (JP); Kouji Sugama, Musashino (JP); Haruo Horiguchi, Koganei (JP); Kazuaki Nakamura, Hino (JP); Toyoko Shibata, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 17/376,289

(22) Filed: Jul. 15, 2021

(65) Prior Publication Data

US 2022/0043333 A1 Feb. 10, 2022

(30) Foreign Application Priority Data

Aug. 7, 2020 (JP) .................................. 2020-135375

(51) Int. Cl.
*C09J 133/08* (2006.01)
*C09J 133/14* (2006.01)
(Continued)

(52) U.S. Cl.
CPC ............ *G03C 1/733* (2013.01); *C09J 133/08* (2013.01); *C09J 133/14* (2013.01);
(Continued)

(58) Field of Classification Search
None
See application file for complete search history.

(56) References Cited

U.S. PATENT DOCUMENTS 3,859,440 A * 1/1975 Serban ................. C07D 333/20
514/438
2004/0248025 A1* 12/2004 Miyakawa ......... G03G 15/0121
430/108.7

(Continued)

FOREIGN PATENT DOCUMENTS

| JP | 2011256155 A | 12/2011 |
| JP | 2011256291 A | 12/2011 |

OTHER PUBLICATIONS

Carletta et al., Halogen-Bond Effects on the Thermo- and Photochromic Behaviour of Anil-Based Molecular Co-crystals, Chem. Eur. J. 2017, 23, 5317-5329.*

(Continued)

*Primary Examiner* — Eli D. Strah
(74) *Attorney, Agent, or Firm* — LUCAS & MERCANTI, LLP

(57) ABSTRACT

Provided is a compound that is fluidized by light irradiation and reversibly non-fluidized, and is not significantly colored. Provided is a photoresponsive compound represented by the following general formula (1), the photoresponsive compound being fluidized by light irradiation and reversibly non-fluidized:

$$R_1-Z_1=Z_2-R_2 \quad \text{General formula (1)}$$

wherein $Z_1$ and $Z_2$ are N or CH, while $Z_1 \neq Z_2$,
$R_1$ contains an aromatic hydrocarbon structure,
$R_2$ contains an aromatic heterocyclic structure, and
a hydrogen atom is bonded to at least one carbon atom bonded adjacent to a carbon atom in the aromatic heterocyclic structure bonded to the $Z_2$.

15 Claims, 3 Drawing Sheets

(51) Int. Cl.
  *G02F 1/00*  (2006.01)
  *G03C 1/73*  (2006.01)
  *G03G 9/09*  (2006.01)
  *B41J 11/00*  (2006.01)
(52) U.S. Cl.
  CPC ........... *G02F 1/0063* (2013.01); *G03G 9/091* (2013.01); *B41J 11/0021* (2021.01)

(56) References Cited

U.S. PATENT DOCUMENTS

| | | | |
|---|---|---|---|
| 2013/0066068 A1 | 3/2013 | Norikane et al. | |
| 2020/0263088 A1* | 8/2020 | Horiguchi | C09K 19/24 |
| 2020/0264530 A1* | 8/2020 | Kusano | C09K 19/22 |
| 2022/0043366 A1* | 2/2022 | Sugama | G03G 9/08797 |
| 2022/0373913 A1* | 11/2022 | Sugama | G03G 15/657 |
| 2022/0390824 A1* | 12/2022 | Nakai | G03C 1/733 |
| 2023/0067136 A1* | 3/2023 | Nakai | G03G 15/2064 |

OTHER PUBLICATIONS

Kondo et al., Photoinduced Exfoliation of a Polymeric N-Benzylideneaniline Liquid-Crystalline Composite Based on a Photoisomerization—Triggered Phase Transition, Macromol. Chem. Phys., Apr. 2021, 222, 2100097-1 to 2100097-6.*

Claramunt et al., Synthesis and Mesogenic Properties of Schiff Bases Derived from Aminopyrazoles, 1999, Heterocylces, vol. 51, No. 4, 751-762.*

* cited by examiner

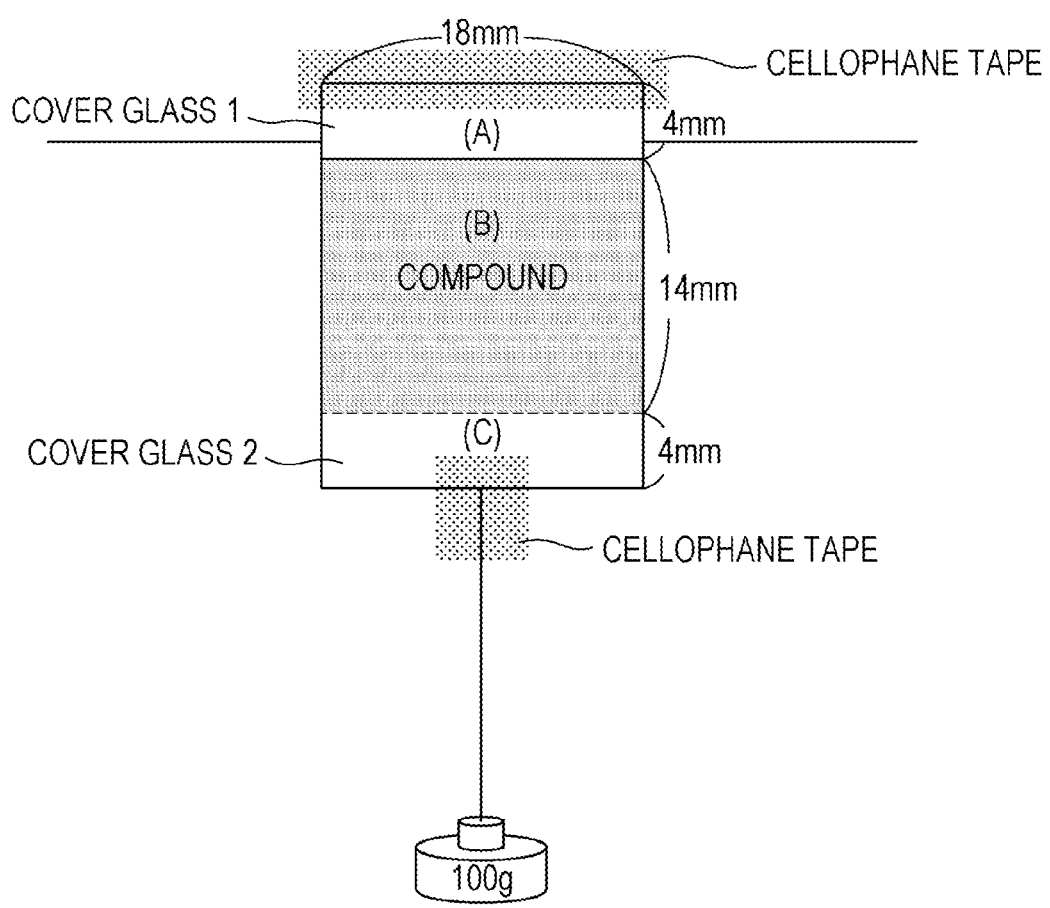

PHOTORESPONSIVE COMPOUND

CROSS-REFERENCE TO RELATED APPLICATION

The entire disclosure of Japanese patent Application No. 2020-135375, filed on Aug. 7, 2020, is incorporated herein by reference in its entirety.

BACKGROUND

Technological Field

The present invention relates to a photoresponsive compound that is fluidized by light irradiation and reversibly non-fluidized.

Background

Photoresponsive materials are known as materials whose fluidity changes by light irradiation. For example, an azobenzene compound (azobenzene derivative) described in Japanese Patent Application Laid-Open No. 2011-256155 or Japanese Patent Application Laid-Open No. 2011-256291 causes a phase change accompanying an isomerization reaction by light irradiation.

This molecular structure change is considered to induce a phase transition from a solid state to a fluidized state. In addition, by changing a wavelength and performing re-irradiation, heating, or leaving in a dark place at room temperature, a reverse reaction occurs and solidifies again.

SUMMARY

However, all of the azobenzene derivatives described in Japanese Patent Application Laid-Open No. 2011-256155 and Japanese Patent Application Laid-Open No. 2011-256291 have coloring of yellow to orange, and there has been a problem that a desired color cannot be reproduced when the azobenzene derivative is applied to industrial products such as toners and adhesives. Furthermore, according to the study of the present inventors, it has been also found that the color of the yellow to orange coloring can be somewhat adjusted by changing a substituent of the azobenzene derivative, but it is impossible to make the coloring essentially colorless or nearly colorless.

Therefore, an object of the present invention is to provide a compound that is fluidized by light irradiation and reversibly non-fluidized, and is not significantly colored.

To achieve at least one of the abovementioned objects, according to an aspect of the present invention, a compound in which, in an azomethine compound having an aromatic hydrocarbon structure and an aromatic heterocyclic structure respectively at both ends of a C=N bond, a hydrogen atom is bonded to at least one carbon atom bonded adjacent to a carbon atom bonded to C=N, in the aromatic heterocyclic structure, is provided.

According to an aspect of the present invention, a photoresponsive compound represented by the following general formula (1), the photoresponsive compound being fluidized by light irradiation and reversibly non-fluidized:

General formula (1)

$$R_1—Z_1=Z_2—R_2 \quad \text{[Chemical 1]}$$

wherein $Z_1$ and $Z_2$ are N or CH, while $Z_1 \neq Z_2$, $R_1$ contains an aromatic hydrocarbon structure,
$R_2$ contains an aromatic heterocyclic structure, and
a hydrogen atom is bonded to at least one carbon atom bonded adjacent to a carbon atom in the aromatic heterocyclic structure bonded to the $Z_2$ is provided.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a schematic view of an apparatus for measuring a change in adhesion associated with light irradiation of a compound used in a photoresponsive adhesion test of Examples.

DETAILED DESCRIPTION OF EMBODIMENTS

Figure 1:
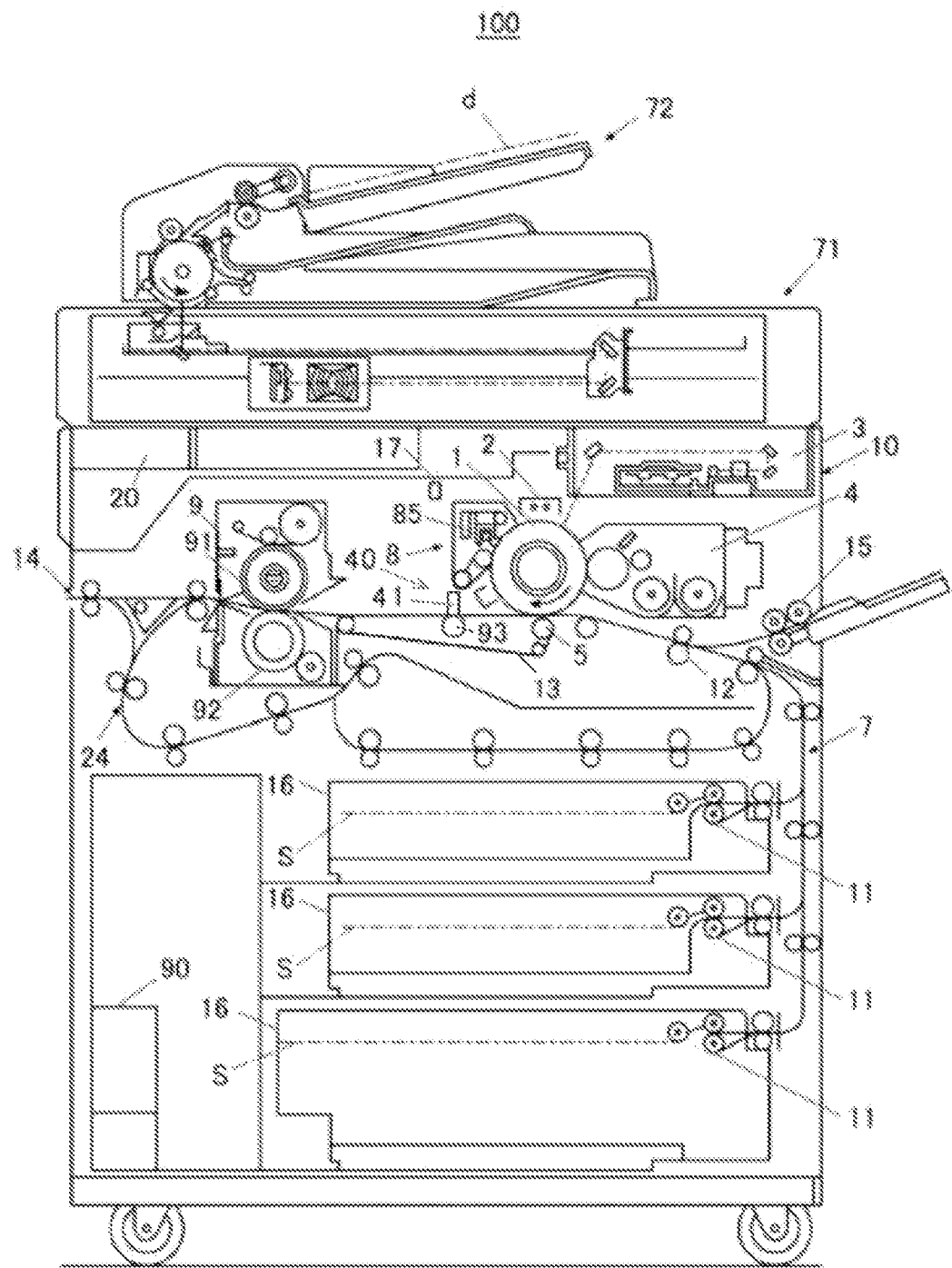
FIG. 1 is a schematic configuration diagram illustrating an image forming apparatus 100 used in an image forming method according to an embodiment of the present invention.

Hereinafter, one or more embodiments of the present invention will be described with reference to the drawings. However, the scope of the invention is not limited to the disclosed embodiments.

In the present specification, the "from X to Y" indicating the range means "X or more and Y or less". Also, in the present specification, unless otherwise specified, the operation and the measurement of physical properties and the like are carried out under conditions of room temperature (from 20 to 25° C.)/relative humidity from 40 to 50% RH.

<Photoresponsive Compound>

An embodiment of the present invention is a photoresponsive compound represented by the following general formula (1), the photoresponsive compound being fluidized by light irradiation and reversibly non-fluidized:

General formula (1)

$$R_1—Z_1=Z_2—R_2 \quad \text{[Chemical 2]}$$

wherein $Z_1$ and $Z_2$ are N or CH, while $Z_1 \neq Z_2$, $R_1$ contains an aromatic hydrocarbon structure,
$R_2$ contains an aromatic heterocyclic structure, and
a hydrogen atom is bonded to at least one carbon atom bonded adjacent to a carbon atom in the aromatic heterocyclic structure bonded to the $Z_2$.

Here, the general formula (1) will be described using one of the following specific examples. As shown in the following formula:

[Chemical 3]

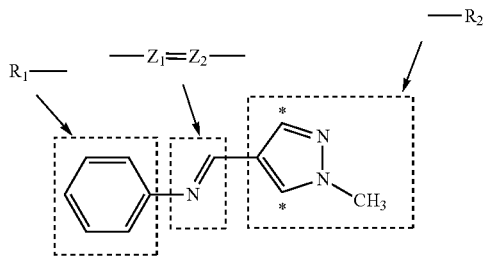

a carbon atom in the aromatic heterocyclic structure is bonded to $Z_2$, at least one of bonding sites adjacent to the carbon atom (that is, bonding sites represented by *) is a carbon atom (two carbon atoms in the specific example), and a hydrogen atom (two hydrogen atoms in the specific example) is bonded to the carbon atom (two carbon atoms in the specific example). In the present specification, the "photoresponsive compound" may also be simply referred to as a "compound". By being such an azomethine compound, it is possible to provide a photoresponsive compound that sufficiently secures photoresponsiveness to be fluidized by light irradiation and reversibly non-fluidized, improves fixability, and further has good color reproducibility.

In the present specification, the phrase "is fluidized by light irradiation and reversibly non-fluidized" refers to changing from a non-fluidized state to a fluidized state by light irradiation and further returning to a non-fluidized state. That is, the compound of the present invention is in a non-fluid solid state when not irradiated with light at normal temperature and normal pressure, and is softened by light irradiation to change to a fluidized state. The light irradiation is stopped, and the compound is left or heated in a dark place at room temperature or under visible light irradiation, thereby returning to the non-fluid solid state. In the present specification, the fluidized state refers to a state of being deformed by a small external force.

A mechanism of exhibiting such a technical effect is presumed as follows. However, the technical scope of the present invention is not limited to such mechanism. That is, an azobenzene compound is a material that absorbs light and softens (optical phase transition) from a solid state, and the optical phase transition is considered to be caused by collapse of crystal structure due to cis-trans isomerization. The azobenzene compound described in Japanese Patent Application Laid-Open No. 2011-256155 or Japanese Patent Application Laid-Open No. 2011-256291 undergoes a phase change accompanying an isomerization reaction by light irradiation, but it has been found that since these compounds exhibit strong absorption derived from n-π* transition in a visible light region and are colored in orange, there is a problem in that it is difficult to reproduce a desired color when the compounds are applied to industrial products.

In the present invention, by using a predetermined azomethine compound, it has been realized to provide a compound that is fluidized by light irradiation and reversibly non-fluidized, and is not significantly colored. By introducing an azomethine moiety (C=N moiety) instead of an azobenzene moiety, strong n-π* absorption in the azobenzene compound can be weakened, so that a compound that is not significantly colored can be realized.

In addition, it is considered that, in a compound that is reversibly fluidized and non-fluidized associated with photoisomerization, when a non-fluid trans-form is irradiated with light and isomerized into a cis-form, many trans-forms change to cis-forms, whereby its ordered structure collapses and a phase transition change, that is, a fluidization phenomenon can be induced. Moreover, it is considered that when the cis-form returns to the trans-form, the ordered structure is formed again, and a non-fluidization phenomenon can be induced. Therefore, in order to induce the fluidization phenomenon, it is considered necessary that many trans-forms are isomerized into cis-forms. However, it is generally known that an azomethine compound has a higher rate of isomerization from a cis-form to a trans-form as compared to an azobenzene compound, and it has been anticipated that it is disadvantageous to induce reversible fluidization and non-fluidization phenomena in an azomethine compound in which an unsubstituted benzene ring is introduced into both ends of a C=N bond respectively.

Therefore, in the present invention, the azomethine compound is made as a compound having an aromatic hydrocarbon structure and an aromatic heterocyclic structure respectively at both ends of a C=N bond, in which at least one of two atoms adjacent to a carbon atom bonded to C=N in the aromatic heterocyclic structure is a carbon atom, and having a hydrogen atom on the carbon atom. Whereby, it is considered that the amount of the cis-form at the time of light irradiation was increased, and fluidization associated with a photoisomerization reaction could be induced. This is considered to be because introduction of an aromatic heterocyclic structure decreases cis→trans reaction rate, and further, in a cis-form, the hydrogen atom on the carbon atom adjacent to the carbon atom bonded to C=N of the aromatic heterocyclic group and the aromatic hydrocarbon group form an intramolecular CH-π interaction, whereby the cis-form is stabilized, and more cis-forms are produced.

Hereinafter, the compound represented by the general formula (1) will be further described.

($Z_1$ and $Z_2$)

In an embodiment of the present invention, as described above, $Z_1$ and $Z_2$ are N or CH, while $Z_1 \neq Z_2$.

($R_1$ and $R_2$)

In an embodiment of the present invention, as described above, $R_1$ contains an aromatic hydrocarbon structure, and $R_2$ contains an aromatic heterocyclic structure.

In an embodiment of the present invention, the aromatic hydrocarbon structure is not particularly limited; however, for example, it is a substituted or unsubstituted aromatic hydrocarbon group, and preferably a substituted or unsubstituted aromatic hydrocarbon group having 6 to 30 carbon atoms. In a preferred embodiment of the present invention, the $R_1$ is a substituted or unsubstituted phenyl group, naphthyl group, anthracenyl group, phenanthrenyl group, pyrenyl group, or biphenyl group. With such a compound, fluidization and non-fluidization can effectively occur. Among them, the $R_1$ is preferably a substituted or unsubstituted phenyl group, naphthyl group or phenanthrenyl group from the viewpoint of easily developing packing between molecules, exhibiting high thermal mobility when trans-cis isomerization is performed, and easily inducing a fluidization phenomenon.

In an embodiment of the present invention, the aromatic heterocyclic structure is not particularly limited; however, for example, it is a substituted or unsubstituted aromatic heterocyclic group, and preferably a substituted or unsubstituted aromatic heterocyclic group having 2 to 30 carbon atoms. The aromatic heterocyclic structure is preferably one having high electron donating property, and in a preferred embodiment of the present invention, the $R_2$ can be a substituted or unsubstituted thienyl group, furanyl group, pyrrolyl group, pyrazolyl group, imidazolyl group, pyridyl group, pyrimidinyl group, pyrazinyl group, triazinyl group, benzothienyl group, benzimidazolyl group, indolyl group, isoindolyl group, quinolinyl group, isoquinolinyl group, quinazolinyl group, quinoxalinyl group, naphthyridinyl group, acridinyl group, carbazolyl group, or dibenzothienyl group. With such a compound, fluidization and non-fluidization can effectively occur.

Each of the aromatic hydrocarbon group and the aromatic heterocyclic group may have a substituent. The substituent is not particularly limited; however, examples thereof include a halogen atom, a cyano group, a nitro group, an amino group, an alkyl group having 1 to 18 carbon atoms, an alkoxy group having 1 to 18 carbon atoms, an alkylamino group having 1 to 10 carbon atoms, a dialkylamino group having 2 to 10 carbon atoms, an acyl group having 2 to 19 carbon atoms, an alkoxycarbonyl group having 2 to 19 carbon atoms, and the like. Preferred are a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms.

As described above, the optical phase transition of the azomethine compound is considered to be caused by collapse of crystal structure due to cis-trans isomerization, similarly to the azobenzene compound. In general, since the azomethine compound has a strong π-π interaction between molecules, the optical phase transition occurs only at the outermost surface of the crystal structure. Here, when the aromatic hydrocarbon group or the aromatic heterocyclic group each represented by $R_1$ or $R_2$ in the general formula (1) has a substituent, the azomethine compound of the present invention forms a specific crystal structure in which structures isotropically disordered by thermal motion of these substituents coexist in a periodic structure dominated by the π-π interaction. Thus, when a cis-trans isomerization reaction locally proceeds and the π-π interaction of the azomethine moiety is reduced, isotropic melting serially occurs in the whole system. Therefore, it is considered that cis-trans isomerization is more likely to proceed, and fluidization is likely to occur.

At this time, at least one of the substituents is preferably a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 18 carbon atoms, or an alkoxycarbonyl group having 2 to 18 carbon atoms. That is, in an embodiment of the present invention, in the general formula (1), at least one of the $R_1$ and the $R_2$ has at least one substituent selected from the group consisting of a halogen atom, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 18 carbon atoms, and an alkoxycarbonyl group having 2 to 18 carbon atoms. It is considered that by having such a structure, cis-trans isomerization is more likely to proceed, and fluidization is likely to occur. Among them, from the viewpoint of high thermal mobility, at least one of the substituents is more preferably an alkyl group having 1 to 18 carbon atoms, an alkoxy group having 1 to 18 carbon atoms, a dialkylamino group having 2 to 10 carbon atoms, an acyl group having 2 to 19 carbon atoms or an alkoxycarbonyl group having 2 to 19 carbon atoms, and further preferably an alkyl group having 1 to 18 carbon atoms, an alkoxy group having 1 to 18 carbon atoms or a dialkylamino group having 2 to 10 carbon atoms.

Furthermore, a preferred embodiment of the present invention is, in the general formula (1), a compound in which the $R_1$ and the $R_2$ each independently have at least one substituent selected from the group consisting of a halogen group, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms and an alkoxycarbonyl group having 2 to 19 carbon atoms, and at least one of the $R_1$ and the $R_2$ has at least one substituent selected from the group consisting of an alkyl group having 1 to 18 carbon atoms, an alkoxy group having 1 to 18 carbon atoms, a dialkylamino group having 2 to 10 carbon atoms, an acyl group having 2 to 19 carbon atoms and an alkoxycarbonyl group having 2 to 19 carbon atoms. By adopting such a configuration, generation of lattice defects, expression of free volume, reduction of π-π interaction and the like that act advantageously on cis-trans isomerization occur. Therefore, it is considered that cis-trans isomerization is more likely to proceed, and fluidization is likely to occur.

As the number of carbon atoms of the substituent, the alkyl group is more preferably an alkyl group having 1 to 12 carbon atoms, and further preferably an alkyl group having 4 to 12 carbon atoms. Moreover, the alkoxy group is more preferably an alkoxy group having 1 to 12 carbon atoms, and further preferably an alkoxy group having 4 to 12 carbon atoms. Further, the dialkylamino group is more preferably a dialkylamino group having 2 to 8 carbon atoms, and further preferably a dialkylamino group having 4 to 6 carbon atoms. The acyl group is more preferably an acyl group having 2 to 13 carbon atoms, and further preferably an acyl group having 5 to 13 carbon atoms. Furthermore, the alkoxycarbonyl group is more preferably an alkoxycarbonyl group having 2 to 13 carbon atoms, and further preferably an alkoxycarbonyl group having 5 to 13 carbon atoms. As such, by introducing a long-chain substituent, crystals become liable to collapse, photo-meltability is improved, and fixability is improved when used in a toner.

Examples of the alkyl group having 1 to 18 carbon atoms are not particularly limited, and examples thereof include linear alkyl groups such as a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, and an n-hexadecyl group; and branched alkyl groups such as an isopropyl group, a sec-butyl group, an isobutyl group, a t-butyl group, a 1-methylpentyl group, a 4-methyl-2-pentyl group, a 3,3-dimethylbutyl group, a 2-ethylbutyl group, a 1-methylhexyl group, a t-octyl group, a 1-methylheptyl group, a 2-ethylhexyl group, a 2-propylpentyl group, a 2,2-dimethylheptyl group, a 2,6-dimethyl-4-heptyl group, a 3,5,5-trimethylhexyl group, a 1-methyldecyl group, and a 1-hexylheptyl group.

Examples of the alkoxy group having 1 to 18 carbon atoms include linear alkoxy groups such as a methoxy group, an ethoxy group, an n-propoxy group, an n-butoxy group, an n-pentyloxy group, an n-hexyloxy group, an n-heptyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, and an n-hexadecyloxy group; and branched alkoxy groups such as a 1-methylpentyloxy group, a 4-methyl-2-pentyloxy group, a 3,3-dimethylbutyloxy group, a 2-ethylbutyloxy group, a 1-methylhexyloxy group, a t-octyloxy group, a 1-methylheptyloxy group, a 2-ethylhexyloxy group, a 2-propylpentyloxy group, a 2,2-dimethylheptyloxy group, a 2,6-dimethyl-4-heptyloxy group, a 3,5,5-trimethylhexyloxy group, a 1-methyldecyloxy group, and a 1-hexylheptyloxy group.

Examples of the alkylamino group having 1 to 10 carbon atoms include a methylamino group, an ethylamino group, an n-propylamino group, an n-butylamino group, an isobutylamino group, an n-hexylamino group, an n-heptylamino group, an n-octylamino group, an n-nonylamino group, an n-decylamino group, and the like.

Examples of the dialkylamino group having 2 to 10 carbon atoms include a dimethylamino group, a diethylamino group, a di-n-propylamino group, a di-n-butylamino group, a di-isobutylamino group, a methylethylamino group, and the like.

Examples of the acyl group having 2 to 19 carbon atoms include saturated or unsaturated linear or branched acyl groups such as an acetyl group, a propanoyl group (propionyl group), a butanoyl group (butyryl group), an isobutanoyl group (isobutyryl group), a pentanoyl group (valeryl group), an isopentanoyl group (isovaleryl group), a sec-pentanoyl group (2-methylbutyryl group), a t-pentanoyl group (pivaloyl group), a hexanoyl group, a heptanoyl group, an octanoyl group, a t-octanoyl group (2,2-dimethylhexanoyl group), a 2-ethylhexanoyl group, a nonanoyl group, an isononanoyl group, a decanoyl group, an isodecanoyl group, an undecanoyl group, a lauroyl group, a myristoyl group, a palmitoyl group, a stearoyl group, a behenoyl group, an undecylenoyl group, an oleoyl group, and the like.

Examples of the alkoxycarbonyl group having 2 to 19 carbon atoms include linear or branched alkoxycarbonyl groups such as linear alkoxycarbonyl groups such as a methoxycarbonyl group, an ethoxycarbonyl group, an n-butoxycarbonyl group, an n-hexyloxycarbonyl group, an n-heptyloxycarbonyl group, an n-octyloxycarbonyl group, an n-nonyloxycarbonyl group, an n-decyloxycarbonyl group, an n-undecyloxycarbonyl group, an n-dodecyloxycarbonyl group, an n-tridecyloxycarbonyl group, an n-tetradecyloxycarbonyl group, an n-pentadecyloxycarbonyl group, and an n-hexadecyloxycarbonyl group; and branched alkoxycarbonyl groups such as a 1-methylpentyloxycarbonyl group, a 4-methyl-2-pentyloxycarbonyl group, a 3,3-dimethylbutyloxycarbonyl group, a 2-ethylbutyloxycarbonyl group, a 1-methylhexyloxycarbonyl group, a t-octyloxycarbonyl group, a 1-methylheptyloxycarbonyl group, a 2-ethylhexyloxycarbonyl group, a 2-propylpentyloxycarbonyl group, a 2,2-dimethylheptyloxycarbonyl group, a 2,6-dimethyl-4-heptyloxycarbonyl group, a 3,5,5-trimethylhexyloxycarbonyl group, a 1-methyldecyloxycarbonyl group, and a 1-hexylheptyloxycarbonyl group.

In an embodiment of the present invention, the compound represented by the general formula (1) is a compound in which two atoms bonded adjacent to a carbon atom in the aromatic heterocyclic structure bonded to the $Z_2$ are both carbon atoms to which a hydrogen atom is bonded. With such an embodiment, the desired effect of the present invention, particularly, fixability, is remarkably improved. In the aromatic heterocyclic structure, when two carbon atoms are adjacent to a carbon atom bonded to a carbon atom or a nitrogen atom constituting a C=N bond, and a hydrogen atom is bonded to each of the two carbon atoms, a probability that an intramolecular CH-π interaction with an aromatic hydrocarbon ring occurs in the cis-form increases. Therefore, it is considered that the cis-form is further stabilized, whereby fluidization associated with photoisomerization can be more effectively exhibited.

($R_2$)

In an embodiment of the present invention, a compound in which the $R_2$ in the general formula (1) is represented by the following formula is provided:

[Chemical 4]

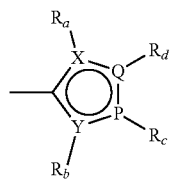

wherein at least two of X, Y, P and Q are carbon atoms, and the remainder is a nitrogen atom, a sulfur atom or an oxygen atom, provided that at least one of X and Y is a carbon atom, and $R_a$, $R_b$, $R_c$ and $R_d$ are each independently an alkyl group having 1 to 18 carbon atoms, an alkoxy group having 1 to 18 carbon atoms or a hydrogen atom when $R_a$, $R_b$, $R_c$ and $R_d$ are present according to valences of X, Y, P and Q, provided that at least one of $R_a$ and $R_b$ bonded to a carbon atom is a hydrogen atom, and $R_b$ and $R_c$ or $R_c$ and $R_d$ may form a fused ring.

In an embodiment of the present invention, it is preferable that at least one of P and Q is a nitrogen atom, and it is more preferable that two of P and Q are nitrogen atoms in the above formula.

In an embodiment of the present invention, it is preferable that X and Y are both carbon atoms, and $R_a$ and $R_b$ are both hydrogen atoms.

In an embodiment of the present invention, at least one of $R_c$ and $R_d$ is a hydrogen atom or an alkyl group having 1 to 18 carbon atoms (for example, an alkyl group having 1 to 12 carbon atoms, preferably an alkyl group having 3 to 8 carbon atoms, and more preferably an alkyl group having 4 to 6 carbon atoms). In particular, the alkyl group having 4 or more carbon atoms efficiently exhibits a desired effect (particularly, a fixability improving effect when used in a toner) of the present invention.

In another embodiment of the present invention, a compound in which the $R_2$ in the general formula (1) is represented by the following formula is provided:

[Chemical 5]

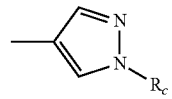

wherein $R_c$ is a hydrogen atom, an alkyl group having 1 to 18 carbon atoms, or an alkoxy group having 1 to 18 carbon atoms. Such an embodiment efficiently exhibits the desired effect (particularly, the fixability improving effect) of the present invention. $R_c$ is preferably a hydrogen atom or an alkyl group having 1 to 12 carbon atoms, and more preferably a hydrogen atom or an alkyl group having 4 to 12 carbon atoms. Such an embodiment efficiently exhibits the desired effect (particularly, the fixability improving effect) of the present invention.

<Method for Producing Photoresponsive Compound>

The method for synthesizing the azomethine compound of the present invention is not particularly limited. For example, when a compound in which $Z_1$ is N, $Z_2$ is CH, $R_1$ is a 4-decyloxyphenyl group, and $R_2$ is a 1-methyl-4 pyrazolyl group in the general formula (1) is taken as an example, the compound can be synthesized by the following Scheme 1.

4-(Decyloxy)benzenamine (4-decyloxyaniline) and 1-methyl-1H-pyrazole-4-carboxaldehyde are reacted by heating and stirring in ethanol (EtOH), the reaction liquid is filtered, the obtained powder is washed with cold ethanol, and recrystallized with methanol/ethanol, whereby an azomethine compound as a target substance can be obtained (see the following Scheme 1). The temperature during heating and stirring is preferably within the range of 0° C. or more and 100° C. or less, more preferably within the range of 30° C. or more and 70° C. or less, and further preferably within the range of 40° C. or more and 60° C. or less.

Scheme 1

[Chemical 6]

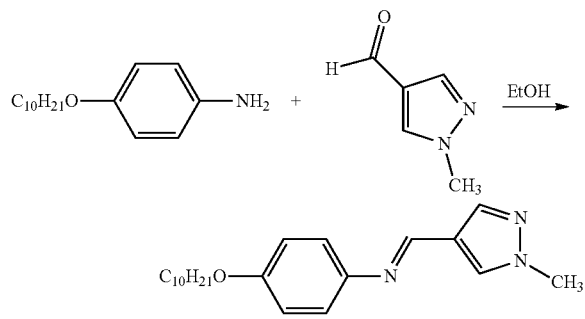

Further, for example, when a compound in which $Z_1$ is N, $Z_2$ is CH, $R_1$ is a 4-hexyloxyphenyl group, and $R_2$ is a 5-methyl-2 thienyl group in the general formula (1) is taken as an example, the compound can be synthesized by the following Scheme 2.

4-(Hexyloxy)aniline and 5-methylthiophene-2-carboxaldehyde are reacted by heating and stirring in ethanol (EtOH), the reaction liquid is filtered, the obtained powder is washed with cold ethanol, and recrystallized with methanol/ethanol, whereby an azomethine compound as a target substance can be obtained (see the following Scheme 2). The temperature during heating and stirring is not particularly limited; however, for example, it is similar to that in the reaction of the above Scheme 1.

Scheme 2

[Chemical 7]

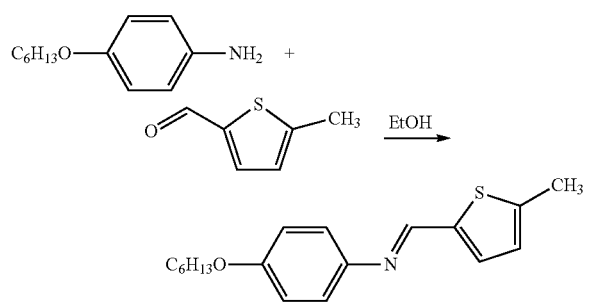

Azomethine compounds other than those described above can also be synthesized by a similar method by changing the raw materials as appropriate by referring to the above Schemes 1 and 2. In addition, for example, in the case of preparing a compound in which $Z_1$ and $Z_2$ of the compound obtained by the reaction of the above Scheme 2 are exchanged, that is, a compound in which $Z_1$ is CH, $Z_2$ is N, $R_1$ is a 4-hexyloxyphenyl group, and $R_2$ is a 5-methyl-2-thienyl group, the compound can be synthesized by changing the raw materials to 4-(hexyloxy)benzaldehyde and 5-methyl-2-thienylamine by referring to the above Scheme 2.

The azomethine compound of the present invention can be used singly or in combination of two or more kinds.

Meanwhile, the molecular weight of the compound represented by the general formula (1) of the present invention is not particularly limited; however, it is preferably 100 or more and less than 1,000, and more preferably 100 or more and 800 or less. Meanwhile, the compound represented by the general formula (1) of the present invention does not contain a polymer. In a preferred embodiment, the compound represented by the general formula (1) is configured not to include a repeating unit. Ina preferred embodiment, the compound represented by the general formula (1) is not a compound obtained by polymerizing a monomer containing a polymerizable group.

An embodiment of the present invention is a photoresponsive compound represented by the following general formula (1), the photoresponsive compound being fluidized by light irradiation and reversibly non-fluidized:

General formula (1)

$R_1$—$Z_1$=$Z_2$—$R_2$ [Chemical 8]

wherein $Z_1$ and $Z_2$ are N or CH, while $Z_1 \neq Z_2$, $R_1$ contains an aromatic hydrocarbon structure, $R_2$ contains an aromatic heterocyclic structure, and a hydrogen atom is bonded to at least one carbon atom bonded adjacent to a carbon atom in the aromatic heterocyclic structure bonded to the $Z_2$;

provided that the following compounds 1) and 2) (compounds specifically disclosed in Tables 1 and 2 below) are excluded.

1) Compounds represented by the following chemical formula 1 that are reversibly fluidized and non-fluidized by light irradiation, in which X, Y, $Z_1$, $Z_2$, and $R_1$ to $R_{10}$ are represented by Table 1 below (in Table 1, the "Group of formula 2" is a group represented by the following chemical formula 2): and

[Chemical 9]

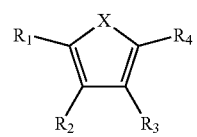
<Chemical formula 1>

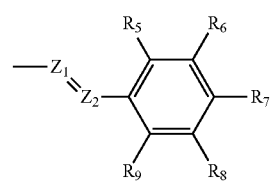
<Chemical formula 2>

2) Photoresponsive compounds represented by the following general formula (1) that are fluidized by light irradiation and reversibly non-fluidized, in which $Z_1$, $Z_2$, A and B are represented by Table 2 below.

[Chemical 10]

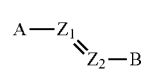
General formula (1)

TABLE 1

| Compound No. | X | $Z_1$ | $Z_2$ | $R_1$ | $R_2$ | $R_3$ | $R_4$ | $R_5$ | $R_6$ | $R_7$ | $R_8$ | $R_9$ | $R_{10}$ |
|---|---|---|---|---|---|---|---|---|---|---|---|---|---|
| 1-1 | S | CH | N | $C_6H_{13}$ | H | H | Group of formula 2 | H | $CH_3$ | $OC_6H_{13}$ | H | H | — |
| 1-2 | | | | $C_8H_{17}$ | H | H | Group of formula 2 | H | $CH_3$ | $OC_6H_{13}$ | H | H | — |
| 1-3 | | | | $C_{12}H_{25}$ | H | H | Group of formula 2 | H | $CH_3$ | $OC_6H_{13}$ | H | H | — |
| 1-4 | | | | $C_3H_7$ | H | H | Group of formula 2 | H | $CH_3$ | $OC_6H_{13}$ | H | H | — |
| 1-5 | | | | $CH_3$ | H | H | Group of formula 2 | H | $CH_3$ | $OC_6H_{13}$ | H | H | — |
| 1-6 | | | | $OC_6H_{13}$ | H | H | Group of formula 2 | H | $CH_3$ | $OC_6H_{13}$ | H | H | — |
| 1-7 | | | | $COC_6H_{13}$ | H | H | Group of formula 2 | H | $CH_3$ | $OC_6H_{13}$ | H | H | — |
| 1-8 | | | | $COOC_6H_{13}$ | H | H | Group of formula 2 | H | $CH_3$ | $OC_6H_{13}$ | H | H | — |
| 1-9 | | | | Br | H | H | Group of formula 2 | H | $CH_3$ | $OC_6H_{13}$ | H | H | — |
| 1-10 | | | | CN | H | H | Group of formula 2 | H | $CH_3$ | $OC_6H_{13}$ | H | H | — |
| 1-11 | | | | $NO_2$ | H | H | Group of formula 2 | H | $CH_3$ | $OC_6H_{13}$ | H | H | — |
| 1-12 | | | | $OCH_3$ | H | H | Group of formula 2 | H | $CH_3$ | $OC_6H_{13}$ | H | H | — |
| 1-13 | | | | OH | H | H | Group of formula 2 | H | $CH_3$ | $OC_6H_{13}$ | H | H | — |
| 1-14 | | | | H | H | H | Group of formula 2 | H | $CH_3$ | $OC_6H_{13}$ | H | H | — |
| 1-15 | | | | $C_6H_{13}$ | $CH_3$ | H | Group of formula 2 | H | $CH_3$ | $OC_6H_{13}$ | H | H | — |
| 1-17 | | | | $C_6H_{13}$ | H | H | Group of formula 2 | $CH_3$ | H | $OC_6H_{13}$ | H | H | — |
| 1-18 | | | | $C_6H_{13}$ | H | H | Group of formula 2 | H | $CH_3$ | $OC_6H_{13}$ | $CH_3$ | H | — |
| 1-19 | | | | $C_6H_{13}$ | H | H | Group of formula 2 | H | H | $OC_6H_{13}$ | H | H | — |
| 1-20 | | | | $CH_3$ | H | H | Group of formula 2 | H | H | $OC_6H_{13}$ | H | H | — |
| 1-21 | | | | Br | H | H | Group of formula 2 | H | H | $OC_6H_{13}$ | H | H | — |
| 1-22 | | | | $OCH_3$ | H | H | Group of formula 2 | H | H | $OC_6H_{13}$ | H | H | — |
| 1-23 | | | | H | H | H | Group of formula 2 | H | H | $OC_6H_{13}$ | H | H | — |
| 1-24 | | | | $C_6H_{13}$ | H | H | Group of formula 2 | H | Et | $OC_6H_{13}$ | H | H | — |
| 1-25 | | | | $C_6H_{13}$ | H | H | Group of formula 2 | H | $OCH_3$ | $OC_6H_{13}$ | H | H | — |
| 1-26 | | | | $C_6H_{13}$ | H | H | Group of formula 2 | H | Br | $OC_6H_{13}$ | H | H | — |
| 1-27 | | | | $C_6H_{13}$ | H | H | Group of formula 2 | H | $CH_3$ | $OC_8H_{17}$ | H | H | — |
| 1-28 | | | | $C_6H_{13}$ | H | H | Group of formula 2 | H | $CH_3$ | $COOC_6H_{13}$ | H | H | — |
| 1-29 | | | | $C_6H_{13}$ | H | H | Group of formula 2 | H | $CH_3$ | $COOC_6H_{13}$ | H | H | — |
| 1-30 | | | | H | $C_6H_{13}$ | H | Group of formula 2 | H | $CH_3$ | $OC_6H_{13}$ | H | H | — |
| 1-31 | | | | H | $CH_3$ | H | Group of formula 2 | H | $CH_3$ | $OC_6H_{13}$ | H | H | — |
| 1-32 | | | | H | Br | H | Group of formula 2 | H | $CH_3$ | $OC_6H_{13}$ | H | H | — |
| 1-33 | | | | H | $C_6H_{13}$ | H | Group of formula 2 | H | H | $OC_6H_{13}$ | H | H | — |
| 1-34 | | | | H | $CH_3$ | H | Group of formula 2 | H | H | $OC_6H_{13}$ | H | H | — |
| 1-35 | | | | H | Br | H | Group of formula 2 | H | H | $OC_6H_{13}$ | H | H | — |
| 1-36 | | | | $C_6H_{13}$ | H | H | Group of formula 2 | H | $CH_3$ | $C_6H_{13}$ | H | H | — |
| 1-37 | | | | $CH_3$ | H | H | Group of formula 2 | H | $CH_3$ | $C_6H_{13}$ | H | H | — |
| 1-38 | | | | Br | H | H | Group of formula 2 | H | $CH_3$ | $C_6H_{13}$ | H | H | — |
| 1-39 | | | | $OCH_3$ | H | H | Group of formula 2 | H | $CH_3$ | $C_6H_{13}$ | H | H | — |
| 1-40 | | | | $C_6H_{13}$ | H | H | Group of formula 2 | H | H | $C_6H_{13}$ | H | H | — |
| 1-41 | | | | $CH_3$ | H | H | Group of formula 2 | H | H | $C_6H_{13}$ | H | H | — |
| 1-42 | | | | Br | H | H | Group of formula 2 | H | H | $C_6H_{13}$ | H | H | — |
| 1-43 | | | | $OCH_3$ | H | H | Group of formula 2 | H | H | $C_6H_{13}$ | H | H | — |
| 1-44 | | | | H | $C_6H_{13}$ | H | Group of formula 2 | H | H | $C_6H_{13}$ | H | H | — |
| 1-45 | | | | H | $CH_3$ | H | Group of formula 2 | H | H | $C_6H_{13}$ | H | H | — |
| 1-46 | | | | H | Br | H | Group of formula 2 | H | H | $C_6H_{13}$ | H | H | — |
| 1-47 | | | | H | $OCH_3$ | H | Group of formula 2 | H | H | $C_6H_{13}$ | H | H | — |
| 1-48 | | | | $CH_3$ | H | H | Group of formula 2 | H | $OC_6H_{13}$ | H | H | H | — |
| 1-49 | | | | $C_6H_{13}$ | H | Group of formula 2 | H | H | $CH_3$ | $OC_6H_{13}$ | H | H | — |
| 1-50 | | N | CH | $C_6H_{13}$ | H | H | Group of formula 2 | H | $CH_3$ | $OC_6H_{13}$ | H | H | — |
| 1-51 | | | | $C_6H_{13}$ | H | H | Group of formula 2 | H | H | $OC_6H_{13}$ | H | H | — |
| 1-52 | O | CH | N | $C_6H_{13}$ | H | H | Group of formula 2 | H | $CH_3$ | $OC_6H_{13}$ | H | H | — |
| 1-53 | | | | H | $C_6H_{13}$ | H | Group of formula 2 | H | $CH_3$ | $OC_6H_{13}$ | H | H | — |
| 1-54 | | | | $C_6H_{13}$ | H | H | Group of formula 2 | H | H | $OC_6H_{13}$ | H | H | — |
| 1-55 | | | | Br | H | H | Group of formula 2 | H | $CH_3$ | $OC_6H_{13}$ | H | H | — |
| 1-56 | | | | H | Br | H | Group of formula 2 | H | $CH_3$ | $OC_6H_{13}$ | H | H | — |
| 1-57 | | | | Br | H | H | Group of formula 2 | H | H | $OC_6H_{13}$ | H | H | — |
| 1-58 | | | | $C_6H_{13}$ | H | Group of formula 2 | H | H | $CH_3$ | $OC_6H_{13}$ | H | H | — |
| 1-59 | $NR_{10}$ | CH | N | H | H | Group of formula 2 | H | H | $CH_3$ | $OC_6H_{13}$ | H | H | H |
| 1-60 | | | | H | H | Group of formula 2 | H | H | $CH_3$ | $OC_6H_{13}$ | H | H | $CH_3$ |
| 1-61 | | | | H | H | Group of formula 2 | H | H | $CH_3$ | $OC_6H_{13}$ | H | H | $C_2H_5$ |
| 1-62 | | | | H | H | Group of formula 2 | H | H | $CH_3$ | $OC_6H_{13}$ | H | H | $C_8H_{17}$ |
| 1-63 | | | | $C_6H_{13}$ | H | Group of formula 2 | H | H | $CH_3$ | $OC_6H_{13}$ | H | H | $CH_3$ |
| 1-64 | | | | $OC_6H_{13}$ | H | Group of formula 2 | H | H | $CH_3$ | $OC_6H_{13}$ | H | H | $CH_3$ |
| 1-65 | | | | Br | H | Group of formula 2 | H | H | $CH_3$ | $OC_6H_{13}$ | H | H | $CH_3$ |
| 1-66 | | | | Br | H | Group of formula 2 | H | H | $CH_3$ | $OC_6H_{13}$ | H | H | H |
| 1-67 | | | | $C_6H_{13}$ | H | Group of formula 2 | H | H | H | $OC_6H_{13}$ | H | H | $CH_3$ |
| 1-68 | | | | Br | H | Group of formula 2 | H | H | H | $OC_6H_{13}$ | H | H | $CH_3$ |
| 1-69 | | | | H | $C_6H_{13}$ | Group of formula 2 | H | H | $CH_3$ | $OC_6H_{13}$ | H | H | $CH_3$ |
| 1-70 | | | | H | H | H | Group of formula 2 | H | $CH_3$ | $OC_6H_{13}$ | H | H | H |
| 1-71 | | | | H | H | H | Group of formula 2 | H | $CH_3$ | $OC_6H_{13}$ | H | H | $C_6H_{13}$ |
| 1-72 | | | | $C_6H_{13}$ | H | H | Group of formula 2 | H | $CH_3$ | $OC_6H_{13}$ | H | H | $CH_3$ |
| 1-73 | | | | H | $C_6H_{13}$ | H | Group of formula 2 | H | $CH_3$ | $OC_6H_{13}$ | H | H | $CH_3$ |
| 1-74 | | | | $C_6H_{13}$ | H | H | Group of formula 2 | H | H | $OC_6H_{13}$ | H | H | $CH_3$ |

TABLE 2

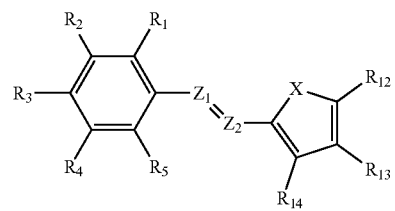

| Compound | A | | | | | | B | | | | |
|---|---|---|---|---|---|---|---|---|---|---|---|
| No. | $Z_1$ | $Z_2$ | $R_1$ | $R_2$ | $R_3$ | $R_4$ | $R_5$ | X | $R_{11}$ | $R_{12}$ | $R_{13}$ | $R_{14}$ |
| 2-11 | N | CH | H | H | $OC_6H_{13}$ | H | H | O | — | H | H | H |
| 2-12 | N | CH | H | H | $OC_6H_{13}$ | H | H | S | — | $CH_3$ | H | H |
| 2-13 | N | CH | H | H | $OC_6H_{13}$ | H | H | S | — | $OCH_3$ | H | H |
| 2-14 | N | CH | H | H | $OC_6H_{13}$ | H | H | S | — | $N(CH_3)_2$ | H | H |
| 2-15 | N | CH | H | H | $C_6H_{13}$ | H | H | S | — | H | H | H |
| 2-16 | N | CH | H | H | $N(CH_3)_2$ | H | H | S | — | $C_4H_9$ | H | H |
| 2-17 | N | CH | H | H | $N(CH_3)_2$ | H | H | S | — | $C_6H_{13}$ | H | H |
| 2-18 | N | CH | H | H | $OC_6H_{13}$ | H | H | $NR_{11}$ | $CH_3$ | H | H | H |
| 2-19 | N | CH | H | H | $C_6H_{13}$ | H | H | $NR_{11}$ | $CH_3$ | H | H | H |
| 2-20 | N | CH | H | H | $N(C_2H_5)_2$ | H | H | $NR_{11}$ | $CH_3$ | H | H | H |
| 2-21 | N | CH | H | H | $OC_6H_{13}$ | H | H | $NR_{11}$ | H | $C_6H_{13}$ | H | H |
| 2-22 | N | CH | H | H | $OC_4H_9$ | H | H | $NR_{11}$ | H | H | H | H |
| 2-23 | N | CH | H | H | $OC_2H_5$ | H | H | $NR_{11}$ | H | $CH_3$ | H | H |
| 2-24 | N | CH | H | H | $OC_6H_{13}$ | H | H | $NR_{11}$ | H | H | H | H |

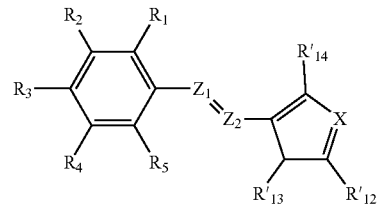

| Compound | A | | | | | | B | | | | |
|---|---|---|---|---|---|---|---|---|---|---|---|
| No. | $Z_1$ | $Z_2$ | $R_1$ | $R_2$ | $R_3$ | $R_4$ | $R_5$ | X | $R_{11}$ | $R'_{12}$ | $R'_{13}$ | $R'_{14}$ |
| 2-25 | N | CH | H | H | $OC_6H_{13}$ | H | H | $NR_{11}$ | $C_6H_{13}$ | H | H | H |
| 2-26 | N | CH | H | H | $OC_4H_9$ | H | H | $NR_{11}$ | H | H | H | H |
| 2-27 | N | CH | H | H | $OC_2H_5$ | H | H | $NR_{11}$ | $CH_3$ | H | H | H |
| 2-28 | N | CH | H | H | $OC_6H_{13}$ | H | H | $NR_{11}$ | H | H | H | H |

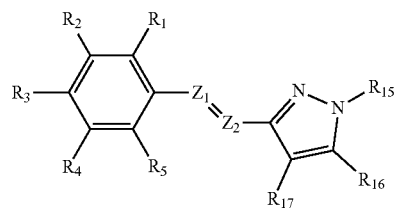

| Compound | A | | | | | | B | | |
|---|---|---|---|---|---|---|---|---|---|
| No. | $Z_1$ | $Z_2$ | $R_1$ | $R_2$ | $R_3$ | $R_4$ | $R_5$ | $R_{15}$ | $R_{16}$ | $R_{17}$ |
| 2-29 | N | CH | H | H | $OC_6H_{13}$ | H | H | H | H | H |
| 2-30 | N | CH | H | H | $OC_6H_{13}$ | H | H | $C_4H_9$ | H | H |
| 2-31 | N | CH | $CH_3$ | H | $OC_6H_{13}$ | H | H | H | H | H |
| 2-32 | N | CH | H | H | $C_6H_{13}$ | H | H | H | H | H |
| 2-33 | N | CH | H | H | $N(CH_3)_2$ | H | H | H | H | H |
| 2-34 | CH | N | H | H | $OC_6H_{13}$ | H | H | $CH_3$ | H | H |
| 2-35 | CH | N | H | H | $C_6H_{13}$ | H | H | $CH_3$ | H | H |
| 2-36 | CH | N | H | H | $N(C_2H_5)_2$ | H | H | $CH_3$ | H | H |

TABLE 2-continued

| Compound | A | | | | | | | | B |
|---|---|---|---|---|---|---|---|---|---|
| No. | $Z_1$ | $Z_2$ | | $R_1$ | $R_2$ | $R_3$ | $R_4$ | $R_5$ | |
| 2-44 | N | CH | | H | $CH_3$ | $OC_6H_{13}$ | H | H | 2 |
| 2-45 | N | CH | | H | $CH_3$ | $OC_6H_{13}$ | H | H | 3 |
| 2-46 | N | CH | | H | H | $N(C_2H_5)_2$ | H | H | 1 |
| 2-47 | CH | N | | H | H | $OC_6H_{13}$ | H | H | 1 |
| 2-48 | CH | N | | H | H | $C_6H_{13}$ | H | H | 1 |

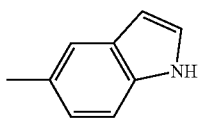

1

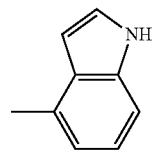

2

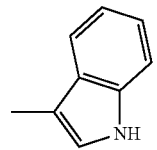

3

| Compound | A | | | | | | | B |
|---|---|---|---|---|---|---|---|---|
| No. | $Z_1$ | $Z_2$ | $R_1$ | $R_2$ | $R_3$ | $R_4$ | $R_5$ | $R_{21}$ |
| 2-49 | N | CH | H | H | $N(C_2H_5)_2$ | H | H | $C_6H_{13}$ |

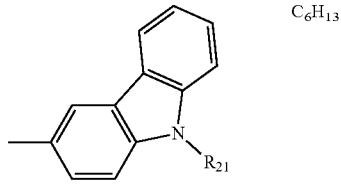

<Fluidization by Light Irradiation and Reversible Non-Fluidization>

The wavelength of the irradiation light when the compound of the present invention is fluidized by light irradiation is preferably in the range of 280 nm or more and 480 nm or less, more preferably within the range of 300 nm or more and 420 nm or less, and further preferably within the range of 330 nm or more and 420 nm or less. When the wavelength is in the above ranges, crystals are likely to collapse (photomeltability is good), and fixability is improved. Furthermore, when fluidizing the compound, fluidization may be promoted by applying heat and pressure in addition to light irradiation. By irradiating with irradiation light having the above wavelength, even when heat or pressure is applied, fluidization can be achieved with less heat or pressure. Therefore, by introducing the compound of the present invention into a toner, fixation at the above wavelength becomes possible, and a toner having excellent fixability and high color reproducibility can be obtained.

Meanwhile, in the wavelength ranges described above, a portion of visible light is included. Therefore, it is desirable that the compound of the present invention is not fluidized only by receiving solar light (natural light) or light produced by illumination such as a fluorescent lamp, but is fluidized by employing low cost conditions in which the irradiation amount and the irradiation time are suppressed as much as possible. From such a viewpoint, as irradiation conditions of the irradiation light when the compound is fluidized, the irradiation amount is preferably within the range of 0.1 J/cm² or more and 200 J/cm² or less, more preferably within the range of 0.1 J/cm² or more and 100 J/cm² or less, and further preferably within the range of 0.1 J/cm² or more and 50 J/cm² or less.

When fluidizing the compound, the compound may be heated together with light irradiation. Whereby, fluidization can be achieved with a lower irradiation amount. The heating temperature at this time is, for example, within the range of 20° C. or more and 200° C. or less, and preferably within the range of 20° C. or more and 150° C. or less.

On the other hand, the conditions for non-fluidizing (re-solidifying) the compound of the present invention is preferably leaving the compound at room temperature (in the range of 25° C. f 15° C.) (in a natural environment). At this time, it is preferable to place the compound in a dark place, but the compound may receive visible light such as natural light or fluorescent light. It is more preferable to apply heat in the process of non-fluidizing the compound. It is also acceptable to apply light.

When the compound is non-fluidized by heating, the heating temperature is preferably within the range of 0° C. or more and 200° C. or less, and more preferably within the range of 20° C. or more and 150° C. or less.

[Configuration of Toner]

An embodiment of the present invention is a toner containing the compound of the present invention. By introducing the compound of the present invention into a toner, it is possible to obtain a toner that can be fixed by light irradiation, has excellent fixability, and has high color reproducibility. Meanwhile, a toner refers to aggregates of toner base particles or toner particles. Toner particles are preferably particles obtained by adding an external additive to toner base particles; however, toner base particles can also be used as toner particles as they are. Meanwhile, in the present invention, when it is not necessary to particularly distinguish between the toner base particles, the toner particles and the toner, they are also simply referred to as "toner".

(Binder Resin)

It is preferable that the toner of the present invention further contains a binder resin, in addition to the predetermined azomethine compound of the present invention. It is generally known that toner particles having a substantially uniform particle size and shape can be prepared by utilizing an emulsion aggregation method described later as a method for producing a toner. It is possible to produce a toner only by adding the azomethine compound alone or a colorant and a release agent thereto as other additives, without using a binder resin. By using the azomethine compound and a binder resin in combination, toner particles having a substantially uniform particle size and shape can be prepared using salting-out in the emulsion aggregation method. Therefore, the toner containing the azomethine compound and a binder resin can be more easily applied to an electrophotographic toner.

As the binder resin, a resin generally used as a binder resin constituting a toner can be used without limitation. As the binder resin, for example, a styrene resin, an acrylic resin, a styrene-acrylic resin, a polyester resin, a silicone resin, an olefin resin, an amide resin, an epoxy resin, and the like can be used. These binder resins can be used singly or in combination of two or more types.

Among these, from the viewpoint of having low viscosity when melted, and having high sharp-meltability, it is preferable that the binder resin includes at least one selected from the group consisting of a styrene resin, an acrylic resin, a styrene-acrylic resin, and a polyester resin; and it is more preferable that the binder resin contains at least one selected from the group consisting of a styrene-acrylic resin and a polyester resin. With such an embodiment, image strength can be increased.

(Styrene-Acrylic Resin)

The styrene-acrylic resin as used in the present invention is a polymer containing at least a structural unit derived from a styrene monomer and a structural unit derived from a (meth)acrylic acid ester monomer. Here, the styrene monomer includes, in addition to styrene represented by the structural formula of $CH_2=CH—C_6H_5$, a monomer having a structure having a known side chain or functional group in the styrene structure.

Examples of the styrene monomer include styrene, o-methylstyrene, m-methylstyrene, p-methylstyrene, α-methylstyrene, p-phenylstyrene, p-ethylstyrene, 2,4-dimethylstyrene, p-t-butylstyrene, p-n-hexylstyrene, p-n-octylstyrene, p-n-nonylstyrene, p-n-decylstyrene, p-n-dodecylstyrene, and the like.

Furthermore, a (meth)acrylic acid ester monomer is a monomer having a functional group having an ester bond in a side chain. Specifically, the (meth)acrylic acid ester monomer includes vinyl-based ester compounds such as, in addition to acrylic acid ester monomers represented by $CH_2=CHCOOR$ (R is an alkyl group), methacrylic acid ester monomers represented by $CH_2=C(CH_3)COOR$ (R is an alkyl group). Meanwhile, the (meth)acrylic acid in the (meth)acrylic acid ester monomer means acrylic acid and methacrylic acid.

Examples of the (meth)acrylic acid ester monomer include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, 2-ethylhexyl (meth)acrylate, stearyl (meth)acrylate, dodecyl (meth)acrylate, phenyl (meth)acrylate, diethylaminoethyl (meth)acrylate, dimethylaminoethyl (meth)acrylate, and the like.

The styrene monomers and (meth)acrylic acid ester monomers can be each used singly or in combination of two or more types.

The contents of the structural unit derived from a styrene monomer and the structural unit derived from the (meth)acrylic acid ester monomer in the styrene-acrylic resin are not particularly limited, and can be appropriately adjusted from the viewpoint of controlling softening point and glass transition temperature of the binder resin. Specifically, the content of the structural unit derived from a styrene monomer is preferably from 40% to 95% by mass, and more preferably from 50% to 90% by mass, with respect to all the structural units constituting the styrene-acrylic resin. Furthermore, the content of the structural unit derived from a (meth)acrylic acid ester monomer is preferably from 5% to 60% by mass, and more preferably 10% to 50% by mass, with respect to all the structural units.

If necessary, the styrene-acrylic resin may further contain a structural unit derived from other monomer other than the styrene monomer and (meth)acrylic acid ester monomer. Examples of the other monomer include vinyl monomers. Examples of the vinyl monomer that can be used in combination when the styrene-acrylic copolymer as used in the present invention is formed will be given below; however, the vinyl monomers that can be used in combination are not limited to those shown below.

(1) Olefins

Ethylene, propylene, isobutylene, and the like (2) Vinyl esters

Vinyl propionate, vinyl acetate, vinyl benzoate, and the like (3) Vinyl ethers

Vinyl methyl ether, vinyl ethyl ether, and the like (4) Vinyl ketones

Vinyl methyl ketone, vinyl ethyl ketone, vinyl hexyl ketone, and the like (5) N-Vinyl compounds N-Vinylcarbazole, N-vinylindole, N-vinylpyrrolidone, and the like (6) Others Vinyl compounds such as vinylnaphthalene and vinylpyridine, acrylic or methacrylic acid derivatives such as acrylonitrile, methacrylonitrile and acrylamide, and the like.

In addition, it is also possible to prepare a resin having a crosslinked structure using a polyfunctional vinyl monomer. Furthermore, it is also possible to use a vinyl monomer having an ionic dissociation group in a side chain. Specific examples of the ionic dissociation group include, for example, a carboxyl group, a sulfonic acid group, a phosphoric acid group, and the like. Specific examples of the vinyl monomer having the ionic dissociation group will be shown below.

Specific examples of the vinyl monomer having a carboxyl group include, for example, acrylic acid, methacrylic acid, maleic acid, itaconic acid, cinnamic acid, fumaric acid, maleic acid monoalkyl ester, itaconic acid monoalkyl ester, and the like.

In the case of forming the styrene-acrylic resin used in the present invention, the contents of the styrene monomer and the (meth)acrylic acid ester monomer are not particularly limited, and can be appropriately adjusted from the viewpoint of controlling the softening point temperature and the glass transition temperature of the binder resin. Specifically, the content of the styrene monomer is preferably from 40% to 95% by mass, and more preferably from 50% to 90% by mass, with respect to the entire monomers constituting the styrene-acrylic resin. Furthermore, the content of the (meth)acrylic acid ester monomer is preferably from 5% to 60% by mass, and more preferably from 10% to 50% by mass, with respect to the entire monomers constituting the styrene-acrylic resin.

The method for forming the styrene-acrylic resin is not particularly limited, and examples thereof include a method of polymerizing monomers using a known oil-soluble or water-soluble polymerization initiator. If necessary, for example, a known chain transfer agent such as n-octyl mercaptan may be used. As the oil-soluble polymerization initiator, for example, an azo-based or diazo-based polymerization initiator or a peroxide-based polymerization initiator as shown below is used.

Examples of the azo-based or diazo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like.

Examples of the peroxide-based polymerization initiator include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, tris(t-butylperoxy)triazine, and the like.

Furthermore, in the case of forming styrene-acrylic resin particles by an emulsion polymerization method, a water-soluble radical polymerization initiator can be used. Examples of the water-soluble radical polymerization initiator include persulfates such as potassium persulfate and ammonium persulfate, azobisaminodipropane acetate, azobiscyanovaleric acid and salts thereof, hydrogen peroxide, and the like.

The polymerization temperature varies depending on the type of monomer or polymerization initiator to be used; however, the polymerization temperature is preferably from 50° C. to 100° C., and more preferably from 55° C. to 90° C. Further, the polymerization time varies depending on the type of monomer or polymerization initiator to be used; however, for example, the polymerization time is preferably from 2 to 12 hours.

The styrene-acrylic resin particles to be formed by an emulsion polymerization method can also be configured to have two or more layers formed from resins of different compositions. As a production method in this case, it is possible to adopt a multi-stage polymerization method of adding a polymerization initiator and a polymerizable monomer to a dispersion liquid of resin particles that have been prepared by an emulsion polymerization treatment (first stage polymerization) according to a conventional method, and subjecting this system to a polymerization treatment (second stage and third stage polymerization).

(Polyester Resin)

The polyester resin is a polyester resin obtainable by a polycondensation reaction between a divalent or higher-valent carboxylic acid (polyvalent carboxylic acid component) and a dihydric or higher-hydric alcohol (polyhydric alcohol component). Meanwhile, the polyester resin may be amorphous or may be crystalline.

The valences of the polyvalent carboxylic acid component and the polyhydric alcohol component are preferably respectively 2 to 3, and more preferably respectively 2. That is, it is preferable that the polyvalent carboxylic acid component includes a dicarboxylic acid component, and it is preferable that the polyhydric alcohol component includes a dialcohol component.

Examples of the dicarboxylic acid component include saturated aliphatic dicarboxylic acids such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedioic acid), 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, and 1,18-octadecanedicarboxylic acid; unsaturated aliphatic dicarboxylic acids such as methylenesuccinic acid, fumaric acid, maleic acid, 3-hexenedioic acid, 3-octenedioic acid, and dodecenylsuccinic acid; and unsaturated aromatic dicarboxylic acids such as phthalic acid, terephthalic acid, isophthalic acid, t-butyl isophthalic acid, tetrachlorophthalic acid, chlorophthalic acid, nitrophthalic acid, p-phenylene-2-acetic acid, 2,6-naphthalenedicarboxylic acid, 4,4'-biphenyldicarboxylic acid, and anthracenedicarboxylic acid; and the like, and lower alkyl esters or acid anhydrides of these can also be used. The dicarboxylic acid components may be used singly or as mixtures of two or more types.

In addition, trivalent or higher-valent polyvalent carboxylic acids such as trimellitic acid and pyromellitic acid, anhydrides or alkyl esters having 1 to 3 carbon atoms of these, and the like can also be used.

Examples of the diol component include saturated aliphatic diols such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosanediol, and neopentyl glycol; unsaturated aliphatic diols such as 2-butene-1,4-diol, 3-butene-1,4-diol, 2-butyne-1,4-diol, 3-butyne-1,4-diol, and 9-octadecene-7,12-diol; aromatic diols such as bisphenols such as bisphenol A and bisphenol F, and alkylene oxide adducts of bisphenols, such as ethylene oxide adducts and propylene oxide adducts of these bisphenols. Furthermore, derivatives thereof can also be used. The diol components may be used singly or as mixtures of two or more types.

The method for producing a polyester resin is not particularly limited, and a polyester resin can be produced by utilizing a known esterification catalyst and polycondensing (esterifying) the polyvalent carboxylic acid component and the polyhydric alcohol component.

Examples of a catalyst that can be used at the time of producing a polyester resin include alkali metal compounds of sodium, lithium, and the like; compounds containing Group 2 elements such as magnesium and calcium; compounds of metals such as aluminum, zinc, manganese, antimony, titanium, tin, zirconium, and germanium; phosphorous acid compounds; phosphoric acid compounds; amine compounds; and the like. Specifically, examples of tin compounds include dibutyltin oxide, tin octoate, tin dioctoate, salts thereof, and the like. Examples of titanium compounds include titanium alkoxides such as tetra-normal-butyl titanate (Ti(O-n-Bu)$_4$), tetraisopropyl titanate, tetramethyl titanate, and tetrastearyl titanate; titanium acylates such as polyhydroxy titanium stearate; titanium chelates such as titanium tetraacetylacetonate, titanium lactate, and titanium triethanolaminate; and the like. Examples of germanium compounds include germanium dioxide and the like. Furthermore, examples of aluminum compounds include polyaluminum hydroxide, aluminum alkoxide, tributyl aluminate, and the like. These may be used singly or in combination of two or more types.

The polymerization temperature is not particularly limited; however, the polymerization temperature is preferably from 70° C. to 250° C. Furthermore, the polymerization time is also not particularly limited; however, the polymerization time is preferably from 0.5 to 10 hours. During polymerization, the pressure inside the reaction system may be reduced as necessary.

When the toner of the present invention contains a binder resin, the content of the azomethine compound is preferably in the range of azomethine compound:binder resin=5:95 to 95:5 (mass ratio), preferably in the range of 10:90 to 90:10 (mass ratio), more preferably in the range of 10:90 to 80:20 (mass ratio), and further preferably in the range of 10:90 to 70:30 (mass ratio), from the viewpoint of fixability and color reproducibility, although it depends on the compound type and the resin type. Within these ranges, optical phase transition of the compound having an azomethine moiety is likely to occur, and softening rate by light irradiation of the toner becomes sufficient. Meanwhile, when two or more types of azomethine compounds are used, the total amount thereof is preferably in the above ranges. When two or more types of binder resins are used, the total amount is preferably in the above ranges.

The glass transition temperature (Tg) of the toner is preferably from 25° C. to 100° C., and more preferably from 30° C. to 80° C., from the viewpoint of fixability, heat-resistant storability, and the like. When the toner contains a binder resin, the glass transition temperature (Tg) of the toner can be adjusted by the content of the binder resin, the type and molecular weight of the binder resin, and the like.

Meanwhile, the toner of the present invention may be particles having a single layer structure or may be particles having a core-shell structure. The types of the binder resins used in core particles and a shell portion of the core-shell structure are not particularly limited.

<Colorant>

The toner of the present invention may further contain a colorant. Since the compound of the present invention is not significantly colored, a toner having high color reproducibility of a colorant can be obtained. As the colorant, generally known dyes and pigments can be used.

Examples of a colorant for obtaining a black toner include carbon black, a magnetic body, iron-titanium composite oxide black, and the like, and examples of the carbon black include channel black, furnace black, acetylene black, thermal black, lamp black, and the like. Furthermore, examples of the magnetic body include ferrite, magnetite, and the like.

Examples of a colorant for obtaining a yellow toner include dyes such as C.I. Solvent Yellow 19, C.I. Solvent Yellow 44, C.I. Solvent Yellow 77, C.I. Solvent Yellow 79, C.I. Solvent Yellow 81, C.I. Solvent Yellow 82, C.I. Solvent Yellow 93, C.I. Solvent Yellow 98, C.I. Solvent Yellow 103, C.I. Solvent Yellow 104, C.I. Solvent Yellow 112, and C.I. Solvent Yellow 162; and pigments such as C.I. Pigment Yellow 14, C.I. Pigment Yellow 17, C.I. Pigment Yellow 74, C.I. Pigment Yellow 93, C.I. Pigment Yellow 94, C.I. Pigment Yellow 138, C.I. Pigment Yellow 155, C.I. Pigment Yellow 180, and C.I. Pigment Yellow 185.

Examples of a colorant for obtaining a magenta toner include dyes such as C.I. Solvent Red 1, C.I. Solvent Red 49, C.I. Solvent Red 52, C.I. Solvent Red 58, C.I. Solvent Red 63, C.I. Solvent Red 111, and C.I. Solvent Red 122; and pigments such as C.I. Pigment Red 5, C.I. Pigment Red 48:1, C.I. Pigment Red 53:1, C.I. Pigment Red 57:1, C.I. Pigment Red 122, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of a colorant for obtaining a cyan toner include dyes such as C.I. Solvent Blue 25, C.I. Solvent Blue 36, C.I. Solvent Blue 60, C.I. Solvent Blue 70, C.I. Solvent Blue 93, and C.I. Solvent Blue 95; and pigments such as C.I. Pigment Blue 1, C.I. Pigment Blue 7, C.I. Pigment Blue 15, C.I. Pigment Blue 15:3, C.I. Pigment Blue 60, C.I. Pigment Blue 62, C.I. Pigment Blue 66, and C.I. Pigment Blue 76.

The colorants for obtaining a toner of each color can be used singly or in combination of two or more types for each color.

The content of the colorant is preferably from 0.5% to 20% by mass, and more preferably from 2% to 10% by mass, in the toner particles (toner base particles) before the addition of an external additive.

<Release Agent>

The toner according to the present invention may further contain a release agent. By introducing a release agent into the toner, in the case of performing thermal fixing together with light irradiation, a toner having superior fixability and high color reproducibility can be obtained.

The release agent to be used is not particularly limited, and various known waxes can be used. Examples of the wax include polyolefins such as low-molecular weight polypropylene and polyethylene, or oxidized type low-molecular weight polypropylene and polyethylene, paraffin wax, synthetic ester wax, and the like. Above all, it is preferable to use a paraffin wax, from the viewpoint of enhancing storage stability of the toner.

The content of the release agent is preferably from 1% to 30% by mass, and more preferably from 3% to 15% by mass, in the toner base particles.

<Charge Control Agent>

The toner according to the present invention may contain a charge control agent. The charge control agent to be used is not particularly limited as long as it is a substance that can give positive or negative charge as a result of frictional charging and is colorless, and various known positive charge type charge control agents and negative charge type charge control agents can be used.

The content of the charge control agent is preferably from 0.01% to 30% by mass, and more preferably from 0.1% to 10% by mass, in the toner base particles.

Meanwhile, the compound of the present invention in the toner is not particularly limited; however, for example, in the range of 5 to 95% by mass with respect to the total amount of the binder resin, colorant, release agent, and the compound of the present invention constituting the toner, from the viewpoint of efficient fluidization and image strength.

<External Additive>

In order to improve fluidity, chargeability, cleaning properties and the like of the toner, the toner according to the present invention may be configured by adding external additives such as a fluidizing agent and a cleaning aid, which are so-called post-treatment agents, to the toner base particles.

Examples of the external additives include inorganic particles, such as inorganic oxide particles such as silica particles, alumina particles, and titanium oxide particles; inorganic stearic acid compound particles such as aluminum stearate particles and zinc stearate particles; and inorganic titanic acid compound particles such as strontium titanate particles and zinc titanate particles. If necessary, these inorganic particles may be subjected to hydrophobization treatment. These can be used singly or in combination of two or more types.

Among these, as the external additives, for example, sol-gel silica particles, silica particles having a hydrophobicized surface (hydrophobic silica particles), or titanium oxide particles having a hydrophobicized surface (hydrophobic titanium oxide particles) are preferred, and among these, it is more preferable to use at least two or more types of external additives.

The number average primary particle size of the external additive is preferably within the range of from 1 to 200 nm, and more preferably from 10 to 180 nm.

The amount of addition of these external additives is preferably from 0.05% to 5% by mass, and more preferably from 0.1% to 3% by mass, in the toner.

In an embodiment of the present invention, the amount of addition of the external additives is preferably from 05% to 5% by mass, and more preferably from 0.1% to 3% by mass, with respect to the toner base particles.

<Average Particle Size of Toner>

The average particle size of the toner (and the average particle size of the toner base particles) is preferably from 4 to 20 μm, and more preferably from 5 to 15 μm, as a volume-based median diameter (D50). When the volume-based median diameter (D50) is in the ranges described above, transfer efficiency is increased, half-tone image quality is enhanced, and image quality of fine lines, dots, and the like is enhanced.

The volume-based median diameter (D50) can be measured and calculated using a measuring apparatus in which a computer system mounted with a software program for data processing "Software V3.51" (manufactured by Beckman Coulter, Inc.) is connected to "COULTER COUNTER 3" (manufactured by Beckman Coulter, Inc.).

Specifically, 0.02 g of a measurement sample (toner or toner base particles) is added to 20 mL of a surfactant solution (a surfactant solution obtained by diluting, for example, a neutral detergent containing a surfactant component ten times with pure water for the purpose of dispersing toner particles), the mixture is mixed thoroughly and evenly, and then ultrasonic dispersion is performed for one minute to prepare a dispersion liquid. This dispersion liquid is injected into a beaker containing "ISOTON II" (manufactured by Beckman Coulter, Inc.) in a sample stand with a pipette until the indicated concentration of the measuring apparatus reaches 8%.

By setting the indicated concentration to the above range, it is possible to obtain reproducible measurement values. Further, with regard to the measuring apparatus, setting the counting number for particles for measurement to 25,000 particles and the aperture diameter to 50 μm, a measurement range of from 1 to 30 μm is divided into 256 parts and the frequency is calculated, and the particle size at 50% of volume fraction integrated from the larger side is defined as the volume-based median diameter (D50).

[Method for Producing Toner]

The method for producing the toner of the present invention is not particularly limited. For example, in a case in which a toner is produced only with the compound of the present invention, it is possible to use a production method including pulverizing the compound using a device such as a hammer mill, a feather mill or a counter jet mill, and then classifying the resultant to a desired particle size using a dry classifier such as SPIN AIR SIEVE, CLASSIEL, or Micron Classifier. In the case of producing a toner further containing a colorant, the compound and the colorant are dissolved into a solution using a solvent in which both the compound of the present invention and the colorant are dissolved, then the solvent is removed, and thereafter, the resultant can be pulverized and classified by the same method as described above.

In particular, the toner containing the compound of the present invention, a binder resin, and if necessary, an additive such as a colorant is preferably produced by a production method utilizing an emulsion aggregation method in which the particle size and shape are easily controlled.

It is preferable that such a production method includes the following steps:

(1A) a binder resin particle dispersion liquid preparation step of preparing a dispersion liquid of binder resin particles;

(1B) a compound particle dispersion liquid preparation step of preparing a dispersion liquid of particles of the compound of the present invention;

(1C) if necessary, a colorant particle dispersion liquid preparation step of preparing a dispersion liquid of colorant particles;

(2) an association step of adding an aggregating agent into an aqueous medium in which the compound particles, binder resin particles, and if necessary, colorant particles are present, promoting salting-out, simultaneously performing aggregation and fusion, and thus forming associated particles;

(3) an aging step of forming toner base particles by controlling the shape of the associated particles;

(4) a filtration and washing step of separating the toner base particles by filtration from the aqueous medium and removing a surfactant and the like from the toner base particles;

(5) a drying step of drying the washed toner base particles; and (6) an external additive addition step of adding an external additive to the dried toner base particles.

Hereinafter, the steps (1A) to (1C) will be described.

(1A) Binder Resin Particle Dispersion Liquid Preparation Step

In this step, resin particles are formed by conventionally known emulsion polymerization or the like, and the resin particles are aggregated and fused to form binder resin particles. As an example, polymerizable monomer constituting the binder resin are charged and dispersed in an aqueous medium, and these polymerizable monomers are polymerized by a polymerization initiator to prepare a dispersion liquid of binder resin particles.

In addition, examples of a method for obtaining a binder resin particle dispersion liquid include, in addition to the method of polymerizing polymerizable monomers using a polymerization initiator in the aqueous medium, a method of performing a dispersion treatment in an aqueous medium without using a solvent, a method of dissolving a crystalline resin in a solvent such as ethyl acetate to form a solution, emulsifying and dispersing the solution into an aqueous medium using a disperser, and then performing a desolvation treatment, and the like.

At this time, a release agent may be incorporated in advance into the binder resin as necessary. In addition, for dispersion, it is also preferable to appropriately perform polymerization in the presence of a known surfactant (for example, an anionic surfactant such as sodium polyoxyethylene(2) dodecyl ether sulfate, sodium dodecyl sulfate, sodium dodecylbenzenesulfonate or dodecylbenzenesulfonic acid).

The volume-based median diameter of the binder resin particles in the dispersion liquid is preferably from 50 to 300 nm. The volume-based median diameter of the binder resin particles in the dispersion liquid can be measured by a dynamic light scattering method using "MICROTRAC UPA-150" (manufactured by NIKKISO CO., LTD.).

(1B) Compound Particle Dispersion Liquid Preparation Step

This compound particle dispersion liquid preparation step is a step of dispersing the compound of the present invention in a microparticulate state in an aqueous medium to prepare a dispersion liquid of particles of the compound.

In preparing a dispersion liquid of particles of the compound, first, an emulsified liquid of the compound is prepared. Examples of a method for preparing the emulsified liquid of the compound include a method of dissolving the compound in an organic solvent and then emulsifying the resulting solution in an aqueous medium.

The method of dissolving the compound in an organic solvent is not particularly limited, and examples thereof include a method of adding the compound to an organic solvent and stirring and mixing the mixture so that the compound is dissolved therein. The amount of addition of the compound is preferably 5 parts by mass or more and 100 parts by mass or less, and more preferably 10 parts by mass or more and 50 parts by mass or less, with respect to 100 parts by mass of the organic solvent.

Next, the resulting solution of the compound is mixed with an aqueous medium, and stirred using a known disperser such as a homogenizer. Whereby, the compound is converted to liquid droplets and is emulsified into the aqueous medium, and thus an emulsified liquid of the compound is prepared.

The amount of addition of the solution of the compound is preferably 10 parts by mass or more and 110 parts by mass or less, with respect to 100 parts by mass of the aqueous medium.

The temperatures of the solution of the compound and the aqueous medium at the time of mixing the solution of the compound and the aqueous medium are each in a temperature range below the boiling point of the organic solvent, and are preferably 20° C. or more and 80° C. or less, and more preferably 30° C. or more and 75° C. or less. The temperature of the solution of the compound and the temperature of the aqueous medium at the time of mixing the solution of the compound and the aqueous medium may be the same or different, and are preferably the same.

As stirring conditions of the disperser, for example, when capacity of a stirring container is 1 to 3 L, rotation speed is preferably 7,000 rpm or more and 20,000 rpm or less, and stirring time is preferably 10 minutes or more and 30 minutes or less.

The dispersion liquid of particles of the compound is prepared by removing the organic solvent from the emulsified liquid of the compound. Examples of a method of removing the organic solvent from the emulsified liquid of the compound include known methods such as air blowing, heating, pressure reduction, or a combination thereof.

As an example, the emulsified liquid of the compound is, for example, heated at preferably 25° C. or more and 90° C. or less and more preferably 30° C. or more and 80° C. or less in an inert gas atmosphere such as nitrogen until, for example, 80% by mass or more and 95% by mass or less of initial amount of the organic solvent is removed (for example, from 20 to 150 minutes), whereby the organic solvent is removed. Whereby, the organic solvent is removed from the aqueous medium, and a dispersion liquid of particles of the compound in which the particles of the compound are dispersed in the aqueous medium is prepared.

Mass average particle size of particles of the compound in the dispersion liquid of particles of the compound is preferably 90 nm or more and 1,200 nm or less. The mass average particle size can be set within the above range, by appropriately adjusting a viscosity when the compound is blended in an organic solvent, a blending ratio of the solution of the compound and the aqueous medium, a stirring rate of a disperser when the emulsified liquid of the compound is prepared, and the like. The mass average particle size of particles of the compound in the dispersion liquid of particles of the compound can be measured using MICROTRAC UPA-150 (manufactured by NIKKISO CO., LTD.) or an electrophoretic light scattering photometer "ELS-800" (manufactured by Otsuka Electronics Co., Ltd.).

<Organic Solvent>

The organic solvent used in this step can be used without any particular limitations as long as the organic solvent can dissolve the compound. Specifically, examples thereof include esters such as ethyl acetate and butyl acetate; ethers such as diethyl ether, diisopropyl ether, and tetrahydrofuran; ketones such as acetone and methyl ethyl ketone; saturated hydrocarbons such as hexane and heptane; and halogenated hydrocarbons such as dichloromethane, dichloroethane, and carbon tetrachloride.

These organic solvents can be used singly or as mixtures of two or more types. Among these organic solvents, ketones and halogenated hydrocarbons are preferred, and methyl ethyl ketone and dichloromethane are more preferred.

<Aqueous Medium>

Examples of the aqueous medium used in this step include water, an aqueous medium containing water as a main component, in which a water-soluble solvent such as an alcohol or a glycol, or optional components such as a surfactant and a dispersant are incorporated, and the like. As the aqueous medium, a mixture of water and a surfactant is preferably used.

Examples of the surfactant include a cationic surfactant, an anionic surfactant, a nonionic surfactant, and the like. Examples of the cationic surfactant include dodecylammonium chloride, dodecylammonium bromide, dodecyltrimethylammonium bromide, dodecylpyridinium chloride, dodecylpyridinium bromide, hexadecyltrimethylammonium bromide, and the like. Examples of the anionic surfactant include fatty acid soaps such as sodium stearate and sodium dodecanoate, sodium dodecylbenzenesulfonate, sodium dodecyl sulfate, and the like. Furthermore, examples of the nonionic surfactant include polyoxyethylene dodecyl ether, polyoxyethylene hexadecyl ether, polyoxyethylene nonylphenyl ether, polyoxyethylene sorbitan monooleate ether, monodecanoyl sucrose, and the like.

These surfactants can be used singly or in combination of two or more types. Among the surfactants, preferably an anionic surfactant, and more preferably sodium dodecyl benzenesulfonate is used.

The amount of addition of the surfactant is preferably 0.01 parts by mass or more and 10 parts by mass or less, and more preferably 0.04 parts by mass or more and 1 part by mass or less, in terms of solid content, with respect to 100 parts by mass of the aqueous medium.

(1C) Colorant Particle Dispersion Liquid Preparation Step

This colorant particle dispersion liquid preparation step is a step of dispersing a colorant in a microparticulate state in an aqueous medium to prepare a dispersion liquid of colorant particles.

Dispersion of the colorant can be carried out by utilizing mechanical energy. The number-based median diameter of the colorant particles in the dispersion liquid is preferably from 10 to 300 nm, and more preferably from 50 to 200 nm. The number-based median diameter of the colorant particles can be measured using an electrophoretic light scattering photometer "ELS-800" (manufactured by Otsuka Electronics Co., Ltd.).

The steps from the (2) association step to the (6) external additive addition step can be carried out according to various conventionally known methods.

Meanwhile, the aggregating agent used in the (2) association step is not particularly limited; however, an aggregating agent selected from metal salts is suitably used. Examples of the metal salt include monovalent metal salts such as salts of alkali metals such as sodium, potassium and lithium; divalent metal salts of calcium, magnesium, manganese, copper, and the like; and trivalent metal salts of iron, aluminum and the like; and the like. Specific examples of the metal salts include sodium chloride, potassium chloride, lithium chloride, calcium chloride, magnesium chloride, zinc chloride, copper sulfate, magnesium sulfate, manganese sulfate, and the like, and among these, it is particularly preferable to use a divalent metal salt, since aggregation can be carried out with a smaller amount. These can be used singly or in combination of two or more types.

[Developer]

Regarding the toner according to the present invention, for example, a case of incorporating a magnetic body into the toner and using as a one-component magnetic toner, a case of mixing the toner with a so-called carrier and using as a two-component developer, a case of using a non-magnetic toner alone, and the like, can be considered, and all can be suitably used.

As the magnetic body, for example, magnetite, γ-hematite, various ferrites, or the like can be used.

As the carrier to be contained in a two-component developer, magnetic particles formed from conventionally known materials such as metals such as iron, steel, nickel, cobalt, ferrite, and magnetite; and alloys of those metals and metals such as aluminum and lead, can be used.

The carrier may be a coated carrier obtained by coating the surface of magnetic particles with a coating agent such as a resin, or may be a resin dispersion type carrier obtained by dispersing a magnetic body powder in a binder resin. The resin for coating is not particularly limited; however, for example, an olefin resin, an acrylic resin, a styrene resin, a styrene-acrylic resin, a silicone resin, a polyester resin, a fluororesin, or the like can be used. Furthermore, the resin for constituting the resin dispersion type carrier particles is not particularly limited, and known resins can be used. For example, an acrylic resin, a styrene-acrylic resin, a polyester resin, a fluororesin, a phenolic resin, or the like can be used.

The volume-based median diameter of the carrier is preferably from 20 to 100 μm, and more preferably from 25 to 80 μm. The volume-based median diameter of the carrier can be measured representatively by a laser diffraction type particle size distribution analyzer "HELOS" (manufactured by Sympatec GmbH) equipped with a wet disperser.

The mixing amount of the toner is preferably from 2% to 10% by mass on the basis of the total mass of the toner and the carrier as 100% by mass.

[Image Forming Method]

The toner of the present invention can be used in various known electrophotographic image forming methods. For example, the toner can be used in a monochrome image forming method or a full color image forming method. In regard to a full-color image forming method, the toner can be applied to any image forming method such as a four-cycle system image forming method constituted by four types of color developing devices respectively related to yellow, magenta, cyan, and black, and one photoreceptor; or a tandem system image forming method in which image forming units each having a color developing device related to each color and a photoreceptor, are mounted for the respective colors.

That is, the image forming method according to an embodiment of the present invention includes: 1) a step of forming a toner image formed of the toner of the present invention on a recording medium; and 2) a step of irradiating the toner image with light and to soften the toner image. With such an embodiment, excellent fixability and higher image quality can be obtained.

As to Step of 1) In this step, a toner image formed of the toner of the present invention is formed on a recording medium.

(Recording medium)

The recording medium is a member for holding a toner image. Examples of the recording medium include plain paper, high quality paper, art paper, coated printing paper such as coated paper, commercially available Japanese paper and postcard paper, resin films for OHP or packaging material, cloth, and the like.

The recording medium may be in a sheet form (sheet-like form) having a predetermined size, or may be in a long form that is wound in a roll form after the toner image is fixed.

Forming of a toner image can be carried out by, as will be described later, for example, transferring a toner image on a photoreceptor onto a recording medium.

As to Step of 2)

In this step, the formed toner image is irradiated with light to soften the toner image. Whereby, the toner image can be adhered onto the recording medium.

The wavelength of the light to be irradiated is not particularly limited as long as the toner image can be sufficiently softened by photothermal conversion or the like by the compound in the toner; however, the wavelength is preferably 280 nm or more and 480 nm or less. When the wavelength is in the above range, the toner image can be softened more efficiently. Furthermore, the irradiation amount of light is preferably 0.1 to 200 $J/cm^2$, more preferably 0.1 to 100 $J/cm^2$, and further preferably 0.1 to 50 $J/cm^2$, from the same viewpoint.

Irradiation with light can be carried out, as will be described below, for example, using a light source such as a light emitting diode (LED) or a laser light source. Moreover, as will be described later, heating may be further carried out together with light irradiation.

After the step of 2), 3) a step of pressing the softened toner image may be further carried out as necessary. With such an embodiment, fixability is improved.

As to Step of 3)

In this step, the softened toner image is pressed.

The pressure at the time of pressing the toner image on the recording medium is not particularly limited; however, the pressure is preferably 0.01 to 5.0 MPa, and more preferably 0.05 to 1.0 MPa. By setting the pressure to 0.01 MPa or more, the amount of deformation of the toner image can be increased, so that the contact area between the toner image and recording paper S is increased, and the fixability of the image can be increased more easily. Furthermore, by setting the pressure to 5.0 MPa or less, shock noise at the time of pressing can be suppressed.

This pressing step may be carried out before or simultaneously with a step of irradiating the toner image with light and softening the toner image (the step of 2) as described above); however, carrying out the pressing step after light irradiation is preferred because the toner image in a state of having been softened in advance can be pressed, and as the result, fixability of the image can be further improved.

Furthermore, in the pressing step, the softened toner image may be further heated. That is, the pressing step may be carried out while heating the toner image. The temperature (for example, temperature of pressing member) at that time is preferably 15° C. or more, more preferably 20° C. or more, further preferably more than 20° C., even more preferably 30° C. or more, and even more preferably 40° C. or more. With such an embodiment, fixability is remarkably improved. The upper limit is not particularly limited, but is, for example, 200° C. or less, 150° C. or less, or 100° C. or less.

The heating temperature of the toner image (surface temperature of the toner image at the time of heating) is, when the glass transition temperature of the toner is designated as Tg, preferably from (Tg+20)° C. to (Tg+100)° C., and more preferably from (Tg+25)° C. to (Tg+80)° C. When the surface temperature of the toner image is (Tg+20)° C. or more, the toner image is easily deformed by pressing, and when the surface temperature is (Tg+100)° C. or less, hot offset is easily suppressed. Meanwhile, the hot offset refers to a phenomenon in which a part of the toner is transferred onto a pressing member such as a roller in the fixing step, and the toner layer is divided.

Furthermore, before the step of 2), 4) a step of heating the toner image in advance may be further carried out as necessary. As such, when 4) a step of heating the toner image in advance can be further carried out before the step of 2), sensitivity of the compound of the present invention to light can be further enhanced. Whereby, the sensitivity to light is not likely to be impaired even with a polymer, so that melting or softening of the toner image by light irradiation is likely to be promoted.

The image forming method of the present invention can be carried out by, for example, using the following image forming apparatus.

FIG. 1 is a schematic configuration diagram illustrating an image forming apparatus 100 used in an image forming method according to an embodiment of the present invention. However, the image forming apparatus used in the present invention is not limited to the following form and the illustrated example. FIG. 1 illustrates an example of a monochrome image forming apparatus 100; however, the present invention can also be applied to a color image forming apparatus.

The image forming apparatus 100 is an apparatus for forming an image on recording paper S as a recording medium, includes an image reading device 71 and an automatic document feeder 72, and forms an image on the recording paper S that is conveyed by a paper conveyance system 7, by an image forming unit 10, an irradiation unit 40, and a compression unit 9.

Furthermore, in the image forming apparatus 100, the recording paper S is used as a recording medium; however, the medium to be subjected to image formation may be the medium other than paper.

Document d placed on a copy holder of the automatic document feeder 72 is scanned and exposed by an optical system of a scanning exposure device of the image reading device 71 and is read by an image sensor CCD. An analog signal that has been photoelectrically converted by the image sensor CCD is subjected to analog processing, A/D conversion, shading compensation, image compression processing and the like in an image processing unit 20, and then is inputted into an exposure device 3 of the image forming unit 10.

The paper conveyance system 7 includes a plurality of trays 16, a plurality of paper feeding units 11, conveyance rollers 12, a conveyance belt 13, and the like. The trays 16 each accommodate recording paper S of an appointed size, and the paper feeding unit 11 of the determined tray 16 is operated in accordance with an instruction from a control unit 90 to feed the recording paper S. The conveyance rollers 12 convey recording paper S that has been sent from the tray 16 by the paper feeding unit 11 or recording paper S that has been carried in from a manual paper feeding unit 15 to the image forming unit 10.

The image forming unit 10 is configured such that a charging device 2, an exposure device 3, a developing unit 4, a transfer unit 5 and a cleaning unit 8 are disposed in this order around a photoreceptor 1, along a rotation direction of the photoreceptor 1.

The photoreceptor 1 as an image carrier is an image carrier having a photoconductive layer formed on a surface and is configured to be rotatable in a direction of arrow in FIG. 1 by a driving apparatus (not illustrated). Near the photoreceptor 1, a temperature humidity meter 17 that detects temperature and humidity inside the image forming apparatus 100 is provided.

The charging device 2 uniformly applies electric charge to the surface of the photoreceptor 1 and evenly electrostatically charges the surface of the photoreceptor 1. The exposure device 3 includes abeam light source such as a laser diode, and the exposure device 3 irradiates the surface of the electrostatically charged photoreceptor 1 with beam light to thereby cause the electric charge of the irradiated portion to be lost, and forms an electrostatic latent image in accordance with the image data on the photoreceptor 1. The developing unit 4 supplies a toner that is accommodated therein to the photoreceptor 1 and forms a toner image based on the electrostatic latent image on the surface of the photoreceptor 1.

The transfer unit 5 faces the photoreceptor 1, with a recording paper S interposed therebetween, and transfers the toner image onto the recording paper S. The cleaning unit 8 includes a blade 85. The surface of the photoreceptor 1 is cleaned by the blade 85, and the developer remaining on the surface of the photoreceptor 1 is removed.

The recording paper S having the toner image transferred thereon is conveyed to the compression unit 9 by the conveyance belt 13. The compression unit 9 is arbitrarily installed, and the compression unit 9 applies a fixing process to the recording paper S having the toner image transferred thereon by applying pressure only or applying heat and pressure by means of pressing members 91 and 92 and thereby fixing the image on the recording paper S. The recording paper S having the image fixed thereon is conveyed to a paper ejection unit 14 by conveyance rollers and is discharged out of the machine from the paper ejection unit 14.

Furthermore, the image forming apparatus 100 includes a paper inverting unit 24, and enables conveying the recording paper S subjected to a heat-fixing process to the paper inverting unit 24 right before the paper ejection unit 14, inverting the front and back, and discharging the recording paper S, or conveying the recording paper S with the front and back reversed, again to the image forming unit 10 and forming an image on both surfaces of the recording paper S.

<Irradiation Unit>

Figure 2:
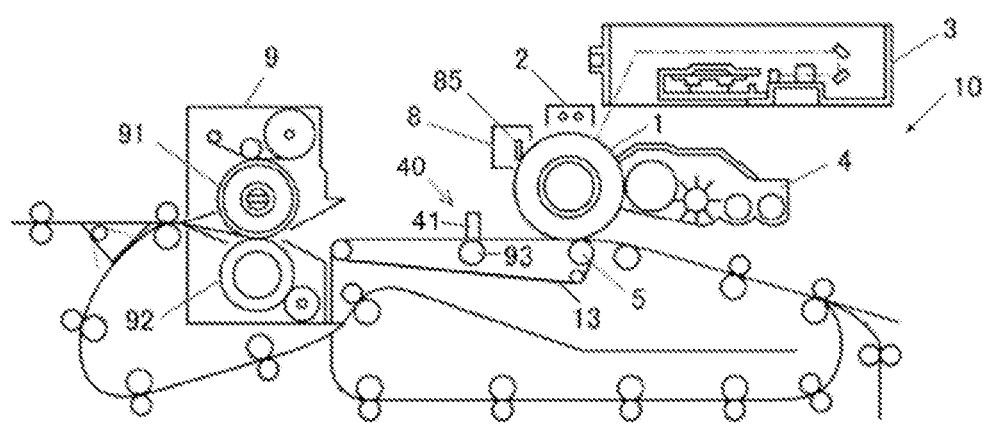
FIG. 2 is a schematic configuration diagram of an irradiation unit 40 in the image forming apparatus 100.

FIG. 2 is a schematic configuration diagram of the irradiation unit 40 in the image forming apparatus 100.

The image forming apparatus 100 according to an embodiment of the present invention includes an irradiation unit 40. The irradiation unit 40 includes a light source 41 and a heating member 93. Examples of a device constituting the light source 41 include a light emitting diode (LED), a laser light source, and the like.

The light source 41 irradiates the toner image formed on the recording medium with light to soften the toner image. Light irradiation conditions are not particularly limited as long as the light irradiation melts and fluidizes the compound of the present invention contained in the toner of the developer. The wavelength of the light to be irradiated to the toner image may be such that the wavelength is of the extent that can sufficiently fluidize the compound, and the wavelength is preferably within the range of 280 nm or more and 480 nm or less, more preferably within the range of 300 nm or more and 420 nm or less, and further preferably within the range of 330 nm or more and 420 nm or less. The irradiation amount of light in the light source 41 may also be such that the light can sufficiently fluidize the compound, for example, the irradiation amount is within the range of 0.1 J/cm$^2$ or more and 200 J/cm$^2$ or less, preferably within the range of 0.1 J/cm$^2$ or more and 100 J/cm$^2$ or less, and more preferably within the range of 0.1 J/cm$^2$ or more and 50 J/cm$^2$ or less.

When the toner image is softened by irradiating the toner image with light by the light source 41, the toner image may be heated by the heating member 93 together with light irradiation. Whereby, softening and melting of the toner image can proceed more efficiently. The heating temperature at this time is, for example, within the range of 20° C. or more and 200° C. or less, and preferably within the range of 20° C. or more and 150° C. or less.

The softened toner image is left, heated, or irradiated with visible light at room temperature (in the range of range of 25±15° C.), whereby the toner image can be solidified and fixed on the recording medium. Meanwhile, as described later, the fixing step preferably further includes a step of pressing the softened toner image. In the pressing step, the softened toner image is preferably further heated.

The light source 41 is to irradiate light toward a first surface on the photoreceptor side in the recording paper S that holds the toner image, and is disposed on the photoreceptor side with respect to the recording paper S surface that is nipped between the photoreceptor 1 and a transfer roller 5 that is a transfer unit. Moreover, the heating member 93 is disposed on the side opposite to the light source 41 with respect to the recording paper S surface. Furthermore, the light source 41 and the heating member 93 are disposed along the conveyance direction (paper conveyance direction) of the recording paper S.

The light source 41 and the heating member 93 are disposed on the downstream side in the paper conveyance direction with respect to the nip position between the photoreceptor 1 and the transfer roller 5 and on the upstream side in the paper conveyance direction with respect to the compression unit 9.

According to the image forming method according to an embodiment of the present invention, the photoreceptor 1 is electrostatically charged by applying uniform electric charge thereto by the charging device 2, subsequently the photoreceptor 1 is scanned with the light flux irradiated by the exposure device 3 based on original image data, and an electrostatic latent image is formed. Next, a developer containing the toner of the present invention is supplied onto the photoreceptor 1 by the developing unit 4.

When recording paper S is conveyed from the tray 16 to the image forming unit 10 in accordance with a timing at which the toner image carried on the surface of the photoreceptor 1 reaches the position of the transfer unit 5 by rotation of the photoreceptor 1, the toner image on the photoreceptor 1 is transferred onto the recording paper S that is nipped between the transfer unit 5 and the photoreceptor 1 by a transfer bias applied to the transfer unit 5.

Furthermore, the transfer unit 5 also functions as a pressing member, and the transfer unit 5 can reliably adhere the compound contained in the toner image to the recording paper S while the toner image can be transferred from the photoreceptor 1 to the recording paper S.

After the toner image is transferred onto the recording paper S, the blade 85 of the cleaning unit 8 removes any developer remaining on the surface of the photoreceptor 1.

In a process in which the recording paper S on which the toner image has been transferred is conveyed to the compression unit 9 by the conveyance belt 13, the light source 41 irradiates the toner image transferred onto the recording paper S with light. By irradiating the toner image on the first surface of the recording paper S with light by the light source 41, the toner image can be more reliably melted, and fixability of the toner image to the recording paper S can be improved.

When the recording paper S holding the toner image reaches the compression unit 9 by the conveyance belt 13, the pressing members 91 and 92 compress the toner image to the first surface of the recording paper S. Since the toner image is softened by light irradiation by the light source 41 before being subjected to a fixing process by the compression unit 9, energy saving of image compression to the recording paper S can be achieved. Furthermore, in the step of solidifying the toner image and fixing the toner image on the recording medium, the toner image is pressed by the pressing members 91 and 92, whereby the fixability of the toner image on the recording paper S is further improved.

The pressure at the time of pressing the toner image is as described above. Meanwhile, the pressing step may be carried out before or simultaneously with the step of irradiating the toner image with light and thereby softening the toner image, or may be carried out after the step. From the viewpoint that a toner image in a state of being softened in advance can be pressed and thus image strength can be easily increased, it is more preferable that the pressing step is carried out after light irradiation.

Furthermore, the pressing member 91 can heat the toner image on the recording paper S when the recording paper S passes through between the pressing members 91 and 92. The toner image softened by light irradiation is further softened by the heating, and as a result, the fixability of the toner image to the recording paper S is further improved.

The heating temperature of the toner image is as described above. The heating temperature of the toner image (surface temperature of the toner image) can be measured by a non-contact temperature sensor. Specifically, for example, a non-contact temperature sensor may be installed at a position where the recording medium is discharged from the pressing member, and the surface temperature of the toner image on the recording medium may be measured.

The toner image compressed by the pressing members 91 and 92 is solidified and fixed on the recording paper S.

In an embodiment of the present invention, a fixing device includes a compression unit including a pressing member.

In an embodiment of the present invention, the pressing member has a heating means.

In an embodiment of the present invention, the temperature of the pressing member is preferably 15° C. or more, more preferably 20° C. or more, further preferably more than 20° C., even more preferably 30° C. or more, and even more preferably 40° C. or more. The upper limit is not particularly limited, but is, for example, 200° C. or less, 150° C. or less, or 100° C. or less.

<Photoresponsive Adhesive>

Since the compound of the present invention is fluidized by light irradiation and reversibly non-fluidized, a photoresponsive adhesive (photosensitive adhesive) that can be repeatedly used can be prepared using the compound of the present invention. For example, the photoresponsive adhesive can be applied to various adhesion technologies as a photoresponsive adhesive capable of repeated photodesorption corresponding to a change in the viscosity (coefficient of friction). That is, an embodiment of the present invention is a photoresponsive adhesive containing the compound of the present invention.

The photoresponsive adhesive of the present invention is also suitable for recycling utilization in addition to use in temporal tacking that can be used repeatedly; however, the photoresponsive adhesive is not limited to these.

<Optical Switching Material>

Since the compound of the present invention is fluidized by light irradiation and reversibly non-fluidized, an optical switching material can be prepared using the compound of the present invention. For example, an optical switching material can be prepared by utilizing a change in color or polarity, mass transfer, a change in orientation, a change in viscosity, and a change in surface tension associated with photoisomerization. For example, in a liquid crystal material or the like, it is possible to apply to patterning drawing that can be repeatedly rewritten in response to a change in orientation of molecules associated with photoisomerization. In addition, for example, a surface of a polymer film can be finely processed by utilizing a change in surface tension associated with light irradiation and mass transfer due to the change. That is, an embodiment of the present invention is an optical switching material containing the compound of the present invention.

The optical switching material of the present invention can be used for surface processing of a liquid crystal display material or a polymer film, but is not limited thereto.

EXAMPLES

Hereinafter, the present invention will be specifically described with reference to Examples, but the present invention is not limited thereto.

Example 14: Synthesis of Compound 14

Into a 100-ml four-necked flask equipped with a cooling tube, a nitrogen introducing tube and a thermometer, 4-(decyloxy)benzenamine (4-decyloxyaniline) (5 mmol), 1-methyl-1H-pyrazole-4-carboxaldehyde (5 mmol) and 20 ml of ethanol were charged, and the mixture was heated and stirred. The reaction liquid was suction-filtered, and the resulting powder was washed with cold ethanol. Further, recrystallization was carried out with methanol/ethanol to obtain compound 14 as a target substance in a yield of 63%.

[Chemical 11]

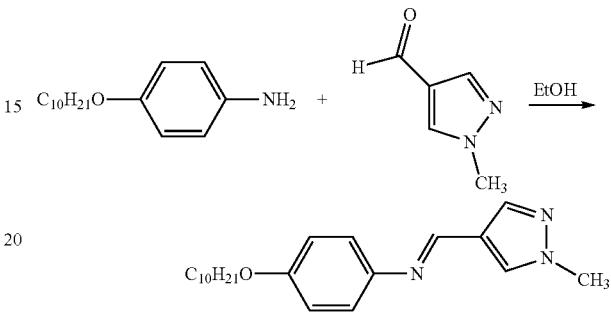

Production of the compound 14 was confirmed by $^1$H NMR. $^1$H NMR (400 MHz, CDCl$_3$); 8.34 ppm (s, 1H, CH=N), 7.89 ppm (s, 1H, pyrazole), 7.84 ppm (2, 1H, pyrazole), 7.12 ppm (d, 2H, aryl), 6.89 ppm (d, 2H, aryl), 4.10 ppm (t, 2H, methylene), 3.94 ppm (s, 3H, methyl), 1.77 ppm (m, 2H, methylene), 1.43 ppm (m, 2H, methylene), 1.33 ppm (m, 4H, methylene), 0.89 ppm (t, 3H, methyl).

Examples 1 to 13, 15, 16, Comparative Example 1

In regard to the synthesis of compounds 1 to 13, 15, 16 and compound of Comparative Example 1, synthesis was performed in the same manner, by changing 4-(decyloxy)benzenamine and 1-methyl-1H-pyrazole-4-carboxaldehyde in the synthesis of compound 14 to respectively corresponding raw materials described below to obtain target substances. In addition, production of each compound was similarly confirmed by $^1$H NMR.

Synthesis of Compound 1: 4-(decyloxy)benzenamine and 5-methylthiophene-2-carboxaldehyde;

Production of the compound 1 was confirmed by $^1$H NMR. $^1$H NMR (400 MHz, CDCl$_3$); 8.37 ppm (s, 1H, CH=N), 7.39 ppm (d, 2H, aryl), 7.06 ppm (d, 1H, thiophene), 6.97 ppm (d, 2H, aryl), 6.67 ppm (d, 2H, thiophene), 4.11 ppm (t, 2H, methylene), 2.43 ppm (s, 3H, methyl), 1.74 ppm (m, 2H, methylene), 1.43 ppm (m, 2H, methylene), 1.29 ppm (m, 2H, methylene), 1.26 ppm (m, 10H, methylene), 0.89 ppm (t, 3H, methyl).

Synthesis of Compound 2: 4-hexyloxy-3-methyl-benzenamine and 5-hexylthiophene-2-carboxaldehyde;

Synthesis of Compound 3: 4-butoxybenzenamine, 5-methylfuran-2-carboxaldehyde;

Synthesis of Compound 4: 4-hexylbenzeneamine, 1-methyl-1H-pyrrole-2-carboxaldehyde;

Synthesis of Compound 5: 4-decyloxy-3-methyl-benzenamine, 1-methyl-1H-pyrazole-3-carboxaldehyde;

Synthesis of Compound 6: 4-(decyloxy)benzenamine, 1-methyl-1H-pyrazole-5-carboxaldehyde;

Synthesis of Compound 7: 4-(decyloxy)benzenamine, 1-methyl-1H-imidazole-4-carboxaldehyde;

Synthesis of Compound 8: 4-(decyloxy)benzenamine, 1-methyl-1H-imidazole-5-carboxaldehyde;

Synthesis of Compound 9: 6-hexyloxy-2-naphthalenamine (2-amino-6-hexyloxynaphthalene), 5-butylthiophene-2-carboxaldehyde;

Synthesis of Compound 10: 4-butoxy-1,1'-biphenyl-4'-amine (4-amino-4'-butoxybiphenyl), 1-methyl-1H-pyrazole-3-carboxaldehyde;

Synthesis of Compound 11: 4-(octyloxy)benzenamine, 1H-indole-3-carboxaldehyde;

Synthesis of Compound 12: 5-methyl-2-thienylamine, 2,6-dimethyl-4-(hexyloxy)-benzaldehyde;

Synthesis of Compound 13: 4-(octyloxy)benzenamine, 1-methyl-1H-pyrrole-3-carboxaldehyde;

Synthesis of Compound 15: 4-(hexyloxy)benzenamine, 1-butyl-1H-pyrazole-4-carboxaldehyde;

Synthesis of Compound 15: 4-(hexyloxy)benzenamine, 1-butyl-1H-pyrazole-4-carboxaldehyde;

Synthesis of Compound 16: 4-hexyloxy-3-methyl-benzenamine, 1-hexyl-1H-pyrazole-4-carboxaldehyde; Synthesis of Comparative Compound 1 (Comparative 1): 4-hexyloxybenzaldehyde, 1,3-dimethyl-1-pyrrole-2-amine.

Structures of Compounds 1 to 16 and Comparative Compound 1 are shown in Table 3.

Synthesis of Comparative Compound 2 (Comparative 2)

The following comparative compound 2 (number average molecular weight Mn: 2870) was obtained by the method described in paragraphs 0217 to 0227 of Japanese Patent Application Laid-Open No. 2014-191078.

[Chemical 12]

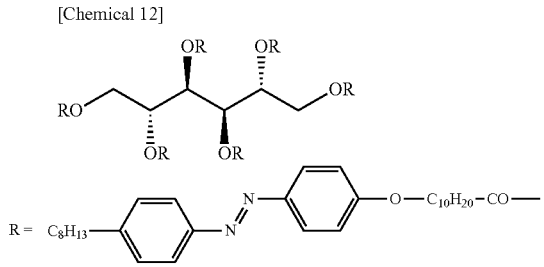

[Preparation of Toner]

(Preparation of Toner 1)

<Preparation of Styrene-Acrylic Resin Particle Dispersion Liquid 1>

(First Stage Polymerization)

A reaction vessel equipped with a stirring device, a temperature sensor, a cooling tube, and a nitrogen introducing unit was charged with a solution in which 8 parts by mass of sodium dodecyl sulfate was dissolved in 3,000 parts by mass of ion-exchanged water, and the internal temperature of the vessel was raised to 80° C. with stirring at a stirring rate of 230 rpm in a nitrogen stream. After raising the temperature, a solution in which 10 parts by mass of potassium persulfate was dissolved in 200 parts by mass of ion-exchanged water was added thereto, and the solution temperature was again set to 80° C. After dropwise addition of a polymerizable monomer solution composed of 480 parts by mass of styrene, 250 parts by mass of n-butyl acrylate, 68.0 parts by mass of methacrylic acid and 16.0 parts by mass of n-octyl-3-mercaptopropionate over 1 hour, the mixture was heated and stirred at 80° C. for 2 hours to perform polymerization, thereby preparing a styrene-acrylic resin particle dispersion liquid (1A) containing styrene-acrylic resin particles (1a).

(Second Stage Polymerization)

A reaction vessel equipped with a stirring device, a temperature sensor, a cooling tube, and a nitrogen introducing unit was charged with a solution in which 7 parts by mass of sodium polyoxyethylene(2) dodecyl ether sulfate was dissolved in 800 parts by mass of ion-exchanged water, and the solution was heated to 98° C. Thereafter, 260 parts by mass of the styrene-acrylic resin particle dispersion liquid (1A) obtained above, and a polymerizable monomer solution obtained by dissolving 245 parts by mass of styrene, 120 parts by mass of n-butyl acrylate, 1.5 parts by mass of n-octyl 3-mercaptopropionate, and 67 parts by mass of a paraffin wax "HNP-11" (manufactured by Nippon Seiro Co., Ltd.) as a release agent at 90° C. were added thereto, and the mixture was mixed and dispersed for 1 hour by a mechanical disperser "CLEARMIX (registered trademark)" (manufactured by M Technique Co., Ltd.) having a circulatory channel, to prepare a dispersion liquid containing emulsified particles (oil droplet). Subsequently, an initiator solution in which 6 parts by mass of potassium persulfate was dissolved in 200 parts by mass of ion-exchanged water was added to this dispersion liquid, and this system was heated and stirred at 82° C. over 1 hour to perform polymerization, thereby preparing a styrene-acrylic resin particle dispersion liquid (1B) containing styrene-acrylic resin particles (1b).

(Third Stage Polymerization)

A solution in which 11 parts by mass of potassium persulfate was dissolved in 400 parts by mass of ion-exchanged water was added to the obtained styrene-acrylic resin particle dispersion liquid (1B), and then a polymerizable monomer solution composed of 435 parts by mass of styrene, 130 parts by mass of n-butyl acrylate, 33 parts by mass of methacrylic acid and 8 parts by mass of n-octyl-3-mercaptopropionate was added dropwise over 1 hour under a temperature condition of 82° C. After completion of the dropwise addition, the mixture was heated and stirred over 2 hours to perform polymerization and then cooled to 28° C. to obtain a styrene-acrylic resin particle dispersion liquid 1 containing styrene-acrylic resin 1. In addition, the glass transition temperature (Tg) of the styrene-acrylic resin 1 was measured and found to be 45° C.

<Preparation of Azomethine Compound Particle Dispersion Liquid 1>

80 Parts by mass of dichloromethane and 20 parts by mass of the compound 1 prepared above were mixed and stirred while being heated at 50° C. to obtain a liquid containing the compound 1. To 100 parts by mass of this liquid, a mixed liquid of 99.5 parts by mass of distilled water warmed to 50° C. and 0.5 parts by mass of a 20% by mass of aqueous sodium dodecylbenzenesulfonate solution was added. Thereafter, the mixture was stirred at 16,000 rpm for 20 minutes and emulsified by a homogenizer (manufactured by Heidorph) equipped with a shaft generator 18F to obtain an emulsified liquid 1 of an azomethine compound.

The resulting emulsified liquid 1 of an azomethine compound was charged into a separable flask, and heated and stirred at 40° C. for 90 minutes while nitrogen was blown into a gas phase to remove the organic solvent, thereby obtaining an azomethine compound particle dispersion liquid 1.

(Preparation of Black Colorant Particle Dispersion Liquid (Bk-1))

11.5 Parts by mass of sodium n-dodecyl sulfate was dissolved in 160 parts by mass of pure water, 25 parts by mass of carbon black "MOGUL L (manufactured by Cabot Corporation)" was gradually added thereto, and then dispersion treatment was performed using "CLEARMIX (registered trademark) W-Motion CLM-0.8 (manufactured by M Technique Co., Ltd.)", thereby preparing a black colorant particle dispersion liquid (Bk-1). The volume-based median diameter of the colorant particles in the black colorant particle dispersion liquid (Bk-1) was 110 nm.

(Aggregation and Fusion)

504 Parts by mass (in terms of solid content) of the styrene-acrylic resin particle dispersion liquid 1 prepared above, 216 parts by mass (in terms of solid content) of the azomethine compound particle dispersion liquid 1, 900 parts by mass of ion-exchanged water, and 70 parts by mass (in terms of solid content) of the black colorant particle dispersion liquid were charged into a reactor equipped with a stirring device, a temperature sensor, and a cooling tube. The temperature in the vessel was maintained at 30° C., and a 5 mol/liter aqueous sodium hydroxide solution was added thereto to adjust the pH to 10.

Next, an aqueous solution obtained by dissolving 2 parts by mass of magnesium chloride hexahydrate in 1,000 parts by mass of ion-exchanged water was added dropwise under stirring over 10 minutes, and then the temperature was started to be raised. The temperature of this system was raised to 70° C. over 60 minutes, and a particle growth reaction was continued while maintaining at 70° C. In this state, the particle size of aggregate particles was measured with "Multisizer 3" (manufactured by Beckman Coulter, Inc.), and at the time when the volume-based median diameter (D50) reached 6.5 μm, an aqueous solution obtained by dissolving 190 parts by mass of sodium chloride in 760 parts by mass of ion-exchanged water was added thereto to stop particle growth. The mixture was stirred at 70° C. for 1 hour, then the temperature was further raised, and the mixture was heated and stirred in a state of 75° C. to implement fusion of the particles. Thereafter, the mixture was cooled to 30° C. to obtain a dispersion liquid of toner base particles.

The dispersion liquid of toner base particles obtained above was subjected to solid-liquid separation with a centrifuge to form a wet cake of the toner base particles. The wet cake was washed with ion-exchanged water at 35° C. using the centrifuge until the electrical conductivity of the filtrate reached 5 μS/cm, then transferred to "FLASH JET DRYER (manufactured by Seishin Enterprise Co., Ltd.)", and dried until the water content reached 0.5% by mass to prepare toner base particles.

To 100% by mass of the resulting toner base particles, 1% by mass of hydrophobic silica (number average primary particle size: 12 nm) and 0.3% by mass of hydrophobic titania (number average primary particle size: 20 nm) were added, and the mixture was mixed using a Henschel mixer (registered trademark) to obtain toner 1.

(Preparation of Toners 2 to 20 and Toners of Comparative Examples 1 and 2)

Toners 2 to 16 and toners of Comparative Examples 1 and 2 were each prepared by the same procedure as the preparation of the toner 1 except that in the preparation of the toner 1, the compound 1 was changed to the compounds 2 to 16 and the compounds of Comparative Examples 1 and 2. In addition, toners 17 to 20 were each prepared by the same procedure except that in the preparation of the toner 1, the compound 1 was changed to the compound 14, and the mass ratio of the compound 14 and the styrene-acrylic resin was changed as shown in Table 5 below.

(Preparation of Toner 21)

Toner 21 was prepared by the same procedure as the preparation of the toner 1 except that in the preparation of the toner 1, the compound 1 was changed to the compound 14, and in the step of (Aggregation and fusion), the styrene-acrylic resin particle dispersion liquid 1 (504 parts by mass in terms of solid content) was changed to the polyester resin particle dispersion liquid 2 (504 parts by mass in terms of solid content) prepared as follows.

<Preparation of Polyester Resin Particle Dispersion Liquid 2 Containing Polyester Resin 1>

Into a 10-liter four-necked flask equipped with a nitrogen introducing tube, a dehydration tube, a stirrer, and a thermocouple, 524 parts by mass of bisphenol A propylene oxide 2 mol adduct, 105 parts by mass of terephthalic acid, 69 parts by mass of fumaric acid, and 2 parts by mass of tin octylate (esterification catalyst) were charged, and a polycondensation reaction was performed at a temperature of 230° C. for 8 hours. Furthermore, the polycondensation reaction was continued at 8 kPa for 1 hour, and then cooled to 160° C. to obtain a polyester resin 1. 100 Parts by mass of the polyester resin 1 was ground with "Roundel Mill Model: RM" (manufactured by TOKUJU Co., LTD), and mixed with 638 parts by mass of 0.26% by mass of sodium lauryl sulfate aqueous solution prepared in advance, and the mixture was ultrasonically dispersed with V-LEVEL at 300 μA for 30 minutes with stirring using an ultrasonic homogenizer "US-150T" (manufactured by Nippon Seiki Co., Ltd.), thereby obtaining a polyester resin particle dispersion liquid 2. In addition, the glass transition point Tg of the polyester resin 1 was measured and found to be 42° C.

(Preparation of Developer)

The toners 1 to 21 and the toners of Comparative Examples 1 and 2 prepared above were mixed with ferrite carrier particles coated with a copolymer resin of cyclohexane methacrylate and methyl methacrylate (monomer mass ratio 1:1) and having a volume average particle size of 30 μm so as to obtain a toner particle concentration of 6% by mass, and developers 1 to 21 and developers of Comparative Examples 1 and 2 were obtained. Mixing was carried out for 30 minutes using a V-type mixer.

[Evaluation: Photoresponsive Adhesion Test of Compound]

Changes in adhesiveness associated with light irradiation of the compounds 1 to 16 prepared in each of Examples and the comparative compounds 1 and 2 were evaluated in the following photoresponsive adhesion test using a device illustrated in FIG. 3. As shown in FIG. 3, 2 mg of a compound was mounted on a cover glass 1 of 18 mm square within a radius of 6 mm from the center of the glass, and a cover glass 2 of the same size was covered at a position shifted by about 4 mm in a direction parallel to the cover glass 1 so as to cover the entire compound. This was heated to melt the sample, and thus the cover glass 1 and the cover glass 2 were adhered. Each of the resulting samples was subjected to a non-fluidity→fluidity test as described below and then subjected to a fluidity→non-fluidity (return) test as described below.

<Non-Fluidity→Fluidity Test>

A part (A) shown in FIG. 3 was fixed to a holder with cellophane tape, and a vinyl string of 30 cm long loaded with a 100-g weight was fixed to a part (C) with cellophane tape. A part (B) was irradiated with light with a wavelength of 365 nm in an irradiation amount of 30 J/cm$^2$, whether the cover glass 2 would come off from the cover glass 1 was confirmed, and the result was determined according to the following evaluation criteria.

—Evaluation Criteria for Non-Fluidity→Fluidity Test—

○: The cover glass 2 completely came off from the cover glass 1.

Δ: The cover glass 2 was shifted.

×: The cover glass 2 did not move.

<Fluidity→Non-Fluidity (Return) Test>

After completion of the non-fluidity→fluidity test, the following experiment was performed on a sample in which the cover glass 2 completely came off and a sample in which the cover glass 2 was shifted. Meanwhile, for the sample shifted, the cover glasses 1 and 2 were peeled off by hand. Five minutes after completion of light irradiation of the non-fluidity→fluidity test (for 5 minutes, left in a natural environment, that is, in a dark room at room temperature), a cover glass 3 (of the same size as the cover glasses 1 and 2) was mounted so as to cover the sample portion (part (B)) of the cover glass 1 used in the above test, whether the cover glass 1 and the cover glass 3 would adhere to each other was confirmed, and the result was determined according to the following evaluation criteria.

—Evaluation Criteria for Fluidity→Non-Fluidity (Return) Test— o: Did not adhere (non-fluidized)

Δ: Partially adhered (a fluidized state was maintained in some portion)

x: Adhered (a fluidized state was maintained).

Meanwhile, it could be confirmed that all of the compounds prepared in Examples, which were rated o in the evaluation of the fluidity→non-fluidity (return) test, were re-solidified after the non-fluidity→fluidity test was performed. The result is shown in Table 4 below.

[Evaluation: Fixability Test]

A fixability test was performed using the developers 1 to 21 and the developers of Comparative Examples 1 and 2 obtained above, in a normal temperature and normal humidity environment (temperature: 20° C., relative humidity: 50% RH). A developer was disposed between a pair of parallel flat plate (aluminum) electrodes, the developer being placed on one electrode and a paper (gloss coated paper, basis weight: 128 g/m$^2$) as a recording medium being placed on the other electrode, while the developer was caused to slide by magnetic force, and the toner was developed at a gap between the electrodes of 0.5 mm under conditions of a DC bias and an AC bias so that the toner adhesion amount would be 6 g/m$^2$. Thus, a toner layer was formed on the surface of the gloss coated paper and was fixed with each fixing device to obtain a printed matter (image formation).

A toner image of 1 cm square of this printed matter was rubbed 10 times with "JK Wiper (registered trademark)" (manufactured by NIPPON PAPER CRECIA CO., LTD.) under a pressure of 50 kPa, and the fixing ratio of the image was evaluated. A fixing ratio of 60% or more was defined as acceptable. The result is shown in Table 5. Meanwhile, the fixing ratio of the image is a numerical value expressed in percentage, obtained by measuring the reflection densities of the printed image and the rubbed image with a fluorescence spectral densitometer "FD-7" (manufactured by Konica Minolta, Inc.), and dividing the reflection density of the rubbed solid image by the reflection density of the printed solid image.

As the fixing device, the following four types of fixing devices configured by appropriately modifying the device illustrated in FIG. 2 were used:

No. 1: The compression unit 9 of FIG. 2 is absent, the temperature of the heating member 93 is 20° C., the wavelength of ultraviolet light irradiated from the light source 41 is 365 nm (light source: LED light source with an emission wavelength of 365 nm±10 nm), and the irradiation amount is 15 J/cm$^2$;

No. 2: The compression unit 9 of FIG. 2 is present, the temperature of the heating member 93 is 20° C., the temperature of the pressing member 91 is 20° C., and the pressure at the time of pressing is 0.2 MPa. The wavelength and irradiation amount of the light source 41 are similar to those of No. 1;

No. 3: The compression unit 9 of FIG. 2 is present, the temperature of the heating member 93 is 20° C., the temperature of the pressing member 91 is 80° C., and the pressure at the time of pressing is 0.2 MPa. The wavelength and irradiation amount of the light source 41 are similar to those of No. 1;

No. 4: The compression unit 9 of FIG. 2 is absent, the temperature of the heating member 93 is 80° C., and the wavelength and irradiation amount of the light source 41 are similar to those of No. 1.

—Evaluation Criteria for Fixability—

⊚: Fixing ratio is 90% or more o: Fixing ratio is 75% or more and less than 90%

Δ: Fixing ratio is 60% or more and less than 75% x: Fixing ratio is less than 60%.

[Color Reproducibility Evaluation]

Color reproducibility of the images of Examples and Comparative Examples obtained above was evaluated by visual evaluation by 10 monitors according to the following evaluation criteria. Specifically, as samples for evaluation and comparison, toners obtained by removing the photoresponsive compound were prepared in contrast with the toners of each of Examples. Developers were prepared in the same manner as described above using these toners, development was carried out in the same manner as the image formation in the fixability test, and fixation was carried out with the following fixing device No. 5.

Fixing device No. 5: The compression unit 9 of FIG. 2 is present, the temperature of the heating member 93 is 20° C., the temperature of the pressing member 91 is 150° C., the pressure at the time of pressing is 0.2 MPa, and light irradiation is not carried out.

The images of the samples for evaluation and comparison and the images obtained in Examples and Comparative Examples described above were shown in sequence to the 10 monitors, and the monitors were asked whether the colors of two images were clearly different. The determination results based on the following evaluation criteria for color reproducibility are shown in Table 5 below.

—Evaluation Criteria for Color Reproducibility—

⊚: 2 or less monitors answered that the colors were clearly different.

o: 3 to 4 monitors answered that the colors were clearly different.

Δ: 5 to 7 monitors answered that the colors were clearly different.

x: 8 or more monitors answered that the colors were clearly different.

TABLE 3

| Compound No. | Structure |
|---|---|
| 1 | $C_{10}H_{21}O$—⟨phenyl⟩—N=CH—⟨thiophene⟩—S—CH$_3$ |

TABLE 3-continued
| Compound No. | Structure |
|---|---|
| 2 | 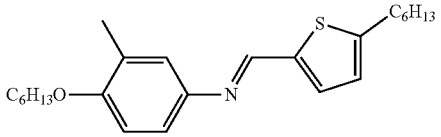 |
| 3 | 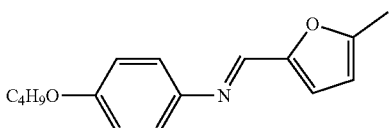 |
| 4 |  |
| 5 | 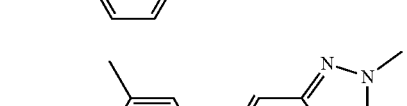 |
| 6 | 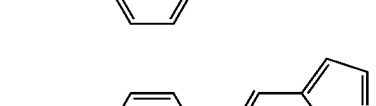 |
| 7 | 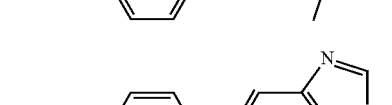 |
| 8 | 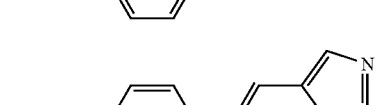 |
| 9 | 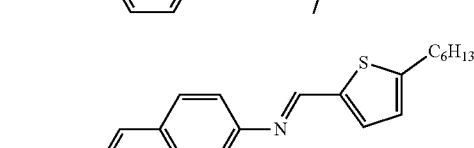 |
| 10 | 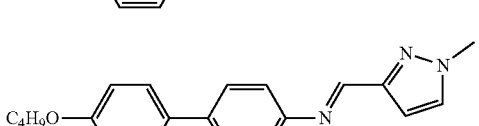 |
| 11 | 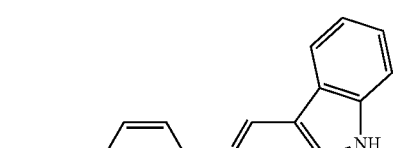 |
| 12 | 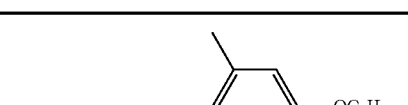 |
| 13 |  |
| 14 | 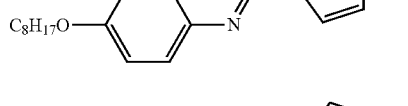 |
| 15 | 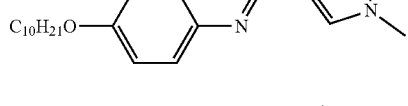 |
| 16 | 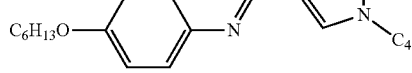 |
| Comparative 1 |  |
TABLE 4
| Compound No. | Photoresponsive adhesion test | |
|---|---|---|
| | Fluidization | Non-fluidization |
| 1 | ○ | ○ |
| 2 | ○ | ○ |
| 3 | ○ | ○ |
| 4 | ○ | ○ |
| 5 | ○ | ○ |
| 6 | ○ | ○ |
| 7 | ○ | ○ |
| 8 | ○ | ○ |
| 9 | ○ | ○ |
| 10 | ○ | ○ |
| 11 | ○ | ○ |
| 12 | ○ | ○ |
| 13 | ○ | ○ |
| 14 | ○ | ○ |
| 15 | ○ | ○ |
| 16 | ○ | ○ |
| Comparative 1 | X | X |
| Comparative 2 | ○ | X |

TABLE 5

| Example No. | Toner No. | Compound No. | Compound Ratio (% by mass) | Binder resin Type | Binder resin Ratio (% by mass) | Fixing device No. | Fixability Rank | Fixability Fixing ratio (%) | Color reproducibility |
|---|---|---|---|---|---|---|---|---|---|
| 1 | 1 | 1 | 30 | Styrene-acrylic resin | 70 | 1 | ○ | 80 | ◎ |
| 2 | 2 | 2 | 30 | Styrene-acrylic resin | 70 | 1 | ○ | 85 | ◎ |
| 3 | 3 | 3 | 30 | Styrene-acrylic resin | 70 | 1 | Δ | 69 | ◎ |
| 4 | 4 | 4 | 30 | Styrene-acrylic resin | 70 | 1 | Δ | 73 | ◎ |
| 5 | 5 | 5 | 30 | Styrene-acrylic resin | 70 | 1 | Δ | 74 | ◎ |
| 6 | 6 | 6 | 30 | Styrene-acrylic resin | 70 | 1 | Δ | 71 | ◎ |
| 7 | 7 | 7 | 30 | Styrene-acrylic resin | 70 | 1 | Δ | 74 | ◎ |
| 8 | 8 | 8 | 30 | Styrene-acrylic resin | 70 | 1 | Δ | 69 | ◎ |
| 9 | 9 | 9 | 30 | Styrene-acrylic resin | 70 | 1 | ○ | 79 | ◎ |
| 10 | 10 | 10 | 30 | Styrene-acrylic resin | 70 | 1 | ○ | 77 | ◎ |
| 11 | 11 | 11 | 30 | Styrene-acrylic resin | 70 | 1 | Δ | 66 | ◎ |
| 12 | 12 | 12 | 30 | Styrene-acrylic resin | 70 | 1 | ◎ | 90 | ◎ |
| 13 | 13 | 13 | 30 | Styrene-acrylic resin | 70 | 1 | ◎ | 91 | ◎ |
| 14 | 14 | 14 | 30 | Styrene-acrylic resin | 70 | 1 | ◎ | 93 | ◎ |
| 15 | 15 | 15 | 30 | Styrene-acrylic resin | 70 | 1 | ◎ | 94 | ◎ |
| 16 | 16 | 16 | 30 | Styrene-acrylic resin | 70 | 1 | ◎ | 95 | ◎ |
| 17 | 17 | 14 | 10 | Styrene-acrylic resin | 90 | 1 | ◎ | 90 | ◎ |
| 18 | 18 | 14 | 50 | Styrene-acrylic resin | 50 | 1 | ◎ | 93 | ◎ |
| 19 | 19 | 14 | 70 | Styrene-acrylic resin | 30 | 1 | ◎ | 92 | ◎ |
| 20 | 20 | 14 | 90 | Styrene-acrylic resin | 10 | 1 | ◎ | 90 | ◎ |
| 21 | 21 | 14 | 30 | Polyester resin | 70 | 1 | ◎ | 93 | ◎ |
| 22 | 14 | 14 | 30 | Styrene-acrylic resin | 70 | 2 | ◎ | 94 | ◎ |
| 23 | 14 | 14 | 30 | Styrene-acrylic resin | 70 | 3 | ◎ | 95 | ◎ |
| 24 | 14 | 14 | 30 | Styrene-acrylic resin | 70 | 4 | ◎ | 94 | ◎ |
| Comparative Example 1 | 23 | Comparative 1 | 30 | Styrene-acrylic resin | 70 | 1 | X | 56 | ◎ |
| Comparative Example 2 | 24 | Comparative 2 | 30 | Styrene-acrylic resin | 70 | 1 | X | 42 | X |

The "compound" in Table 5 refers to an azomethine compound of each of Examples and Comparative Examples. In Table 5, the ratio of the compound and the binder resin are a ratio (% by mass) of the azomethine compound and the binder resin to the total amount of the azomethine compound and the binder resin in the toner, respectively.

As is apparent from Table 4 above, it was found that all of the compounds 1 to 16 of Examples are fluidized by light irradiation and are reversibly non-fluidized. On the other hand, it was found that fluidization by light irradiation and non-fluidization do not occur in the compound of Comparative Example 1 in which in the aromatic heterocyclic structure constituting the azomethine compound, a hydrogen atom is not present on a carbon atom bonded adjacent to a carbon atom bonded to a nitrogen atom of a C=N bond. In addition, in the azobenzene compound of Comparative Example 2, reversible non-fluidization after fluidization was not confirmed.

As is apparent from Table 5 above, the toners 1 to 21 of each of Examples exhibited high fixability and excellent color reproducibility. On the other hand, in the toner of Comparative Example 1 using a compound in which a hydrogen atom is not present on the carbon atom bonded adjacent to a carbon atom bonded to a nitrogen atom of a C=N bond, sufficient fixability by light irradiation is not obtained. In addition, the toner of Comparative Example 2 using an azobenzene compound has insufficient fixability and low color reproducibility. Since the light source of ultraviolet ray and the irradiation conditions of the ultraviolet ray used in the fixability test were constant throughout Examples and Comparative Examples, it can be said that as compared with the toner of Comparative Examples, the toner of the Examples sufficiently exhibited an effect of the azomethine compound that is fluidized by light irradiation and reversibly non-fluidized, and is not significantly colored.

In particular, in Examples 13 to 16 using the compounds 13 to 16 in which a hydrogen atom is present on both two carbon atoms bonded adjacent to the carbon atom in the aromatic heterocyclic structure bonded to a nitrogen atom or carbon atom of a C=N bond, fixability was further improved.

As a result of comparison of the fixing devices, it was found that higher fixability is obtained when using the fixing device No. 2 by which pressing is performed with the pressing member and the fixing device No. 3 by which pressing is performed with the pressing member while heating than when using the fixing device No. 1 that uses the same toner 14, irradiates ultraviolet rays under the same conditions, and does not use a pressing member (Comparison of Examples 14, 22 and 23). In addition, higher fixability was obtained when using the device No. 4 that performs heating with the heating member 93 than when using the fixing device No. 1 that uses the same toner 14, irradiates ultraviolet rays under the same conditions, and does not perform heating at the time of ultraviolet irradiation (Comparison of Examples 1 and 24).

REFERENCE SIGNS LIST

1 Photoreceptor
2 Charging device
3 Exposure device
4 Developing unit
5 Transfer unit
7 Paper conveyance system
8 Cleaning unit
9 Compression unit
10 Image forming unit
11 Paper feeding unit
12 Conveyance roller
13 Conveyance belt 14 Paper ejection unit
15 Manual paper feeding unit
16 Tray
17 Temperature humidity meter
20 Image processing unit
24 Paper inverting unit
40 Irradiation unit
41 Light source
71 Image reading device
72 Automatic document feeder
85 Blade
90 Control unit
91, 92 Pressing member
93 Heating member
100 Image forming apparatus
d Document
S Recording paper Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2020-135375, filed on Aug. 7, 2020, is incorporated herein by reference in its entirety.

What is claimed is:

1. A photoresponsive compound represented by the following general formula (1), the photoresponsive compound being fluidized by light irradiation and reversibly non-fluidized:

$$R_1-Z_1=Z_2-R_2 \quad \text{General formula (1)}$$

wherein $Z_1$ is N, and $Z_2$ is CH, $R_1$ contains an aromatic hydrocarbon structure, $R_2$ contains an aromatic heterocyclic structure, a hydrogen atom is bonded to at least one carbon atom bonded adjacent to a carbon atom in the aromatic heterocyclic structure bonded to the $Z_2$, and $R_2$ is represented by the following formula:

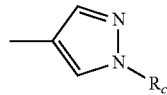

wherein $R_c$ is a hydrogen atom, an alkyl group having 1 to 18 carbon atoms, or an alkoxy group having 1 to 18 carbon atoms.

2. The compound according to claim 1, wherein the $R_1$ is a substituted or unsubstituted phenyl group, naphthyl group, anthracenyl group, phenanthrenyl group, pyrenyl group, or biphenyl group.

3. The compound according to claim 1, wherein the $R_1$ has at least one substituent selected from the group consisting of a halogen group, a cyano group, a nitro group, an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms.

4. The compound according to claim 3, wherein the $R_1$ has at least one substituent selected from the group consisting of an alkyl group having 1 to 18 carbon atoms, an alkoxy group having 1 to 18 carbon atoms, a dialkylamino group having 2 to 10 carbon atoms, an acyl group having 2 to 19 carbon atoms, and an alkoxycarbonyl group having 2 to 19 carbon atoms.

5. The compound according to claim 1, wherein a wavelength of light in the light irradiation is 280 nm or more and 480 nm or less.

6. A toner comprising the compound according to claim 1.

7. The toner according to claim 6, further comprising a binder resin.

8. The toner according to claim 7, wherein the binder resin contains at least one selected from the group consisting of styrene-acrylic resins and polyester resins.

9. An image forming method comprising:
forming a toner image formed of the toner according to claim 6 on a recording medium; and
irradiating the toner image with light to soften the toner image.

10. The image forming method according to claim 9, wherein a wavelength of the light is 280 nm or more and 480 nm or less.

11. The image forming method according to claim 9, further comprising pressing the toner image.

12. The image forming method according to claim 11, further heating the toner image in the pressing.

13. The image forming method according to claim 9, wherein, in the irradiating the toner image with light to soften the toner image, the toner image is heated together with light irradiation.

14. A photoresponsive adhesive comprising the compound according to claim 1.

15. An optical switching material comprising the compound according to claim 1.

* * * * *